United States Patent [19]

Gysling

[11] 4,164,765

[45] Aug. 14, 1979

[54] CAROUSEL TAPE SYSTEM

[75] Inventor: Walter Gysling, Excelsior, Minn.

[73] Assignee: National Computer Systems, Inc., Minneapolis, Minn.

[21] Appl. No.: 858,605

[22] Filed: Dec. 7, 1977

[51] Int. Cl.² ............................................. G11B 15/68
[52] U.S. Cl. ...................................................... 360/92
[58] Field of Search .......................................... 360/92

[56] References Cited

U.S. PATENT DOCUMENTS

| | | | |
|---|---|---|---|
| 3,682,483 | 8/1972 | White | 360/92 |
| 3,752,485 | 8/1973 | Okabe | 360/92 |
| 3,810,239 | 5/1974 | Kozu et al. | 360/92 |

*Primary Examiner*—Robert S. Tupper
*Attorney, Agent, or Firm*—Merchant, Gould, Smith, Edell, Welter & Schmidt

[57] ABSTRACT

Apparatus for storing and transferring digital electromagnetic information. The apparatus makes use of a plurality of standard pipe cartridges each of which is independently capable of storing a quantity of electromagnetic information. The cartridges are removably stored in a carousel which is rotatably carried on a control housing. The carousel is removable from the control housing, permitting interchangeability of carousels and access to substantial quantitites of stored information. The control housing includes a plurality of independently operable read/write stations, each of which has a read/write head for transferring information. The read/write heads are selectively connected to output ports permitting access to computer equipment. The control housing also includes means for indexing a selected cartridge relative to a selected read/write station. Each of the stations includes means for effecting release of the indexed cartridge from the carousel and for transporting the cartridge to a read/write position within the station. After information is transferred between the cartridge tape and read/write head, the cartridge is returned to its stored position in the carousel. Each of the stations is provided with means for sensing improper orientation of the cartridge within the carousel and for preventing release of the cartridge from the carousel if improperly oriented.

61 Claims, 39 Drawing Figures

FIG. 5
FIG. 7
FIG. 6
FIG. 8
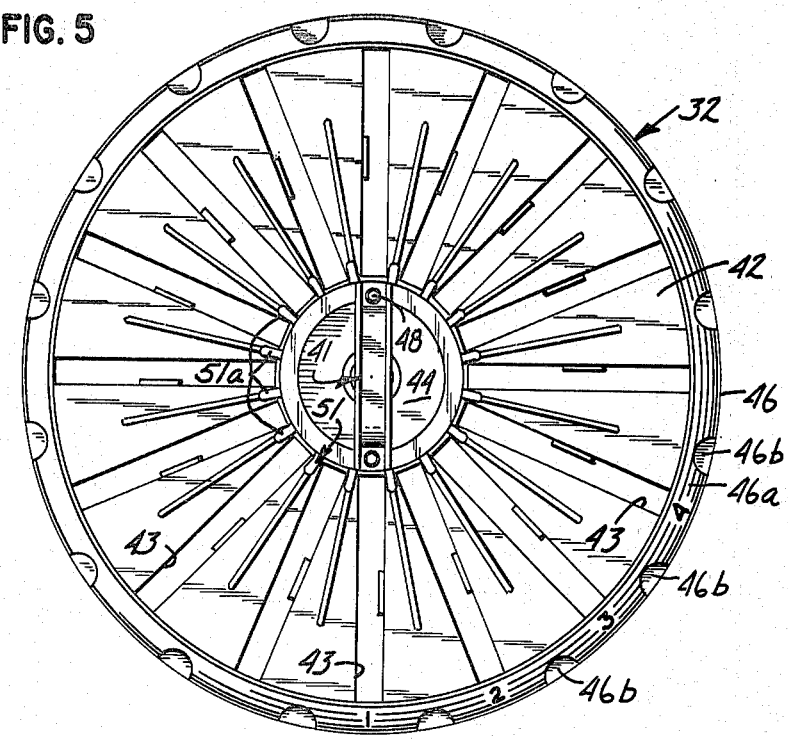
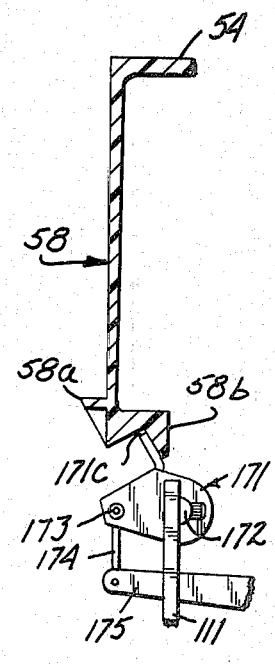
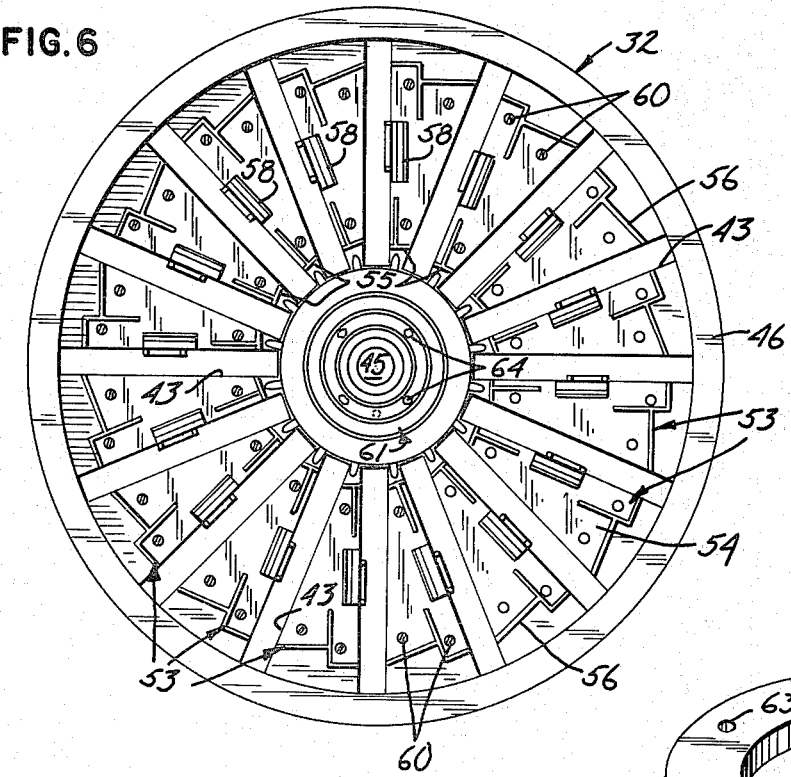
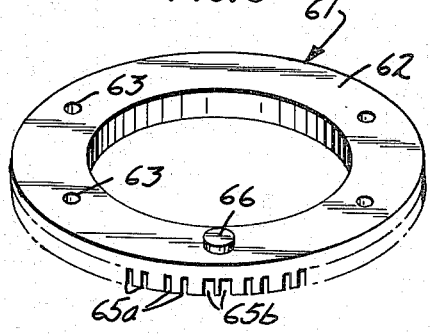

FIG. 11
FIG. 12
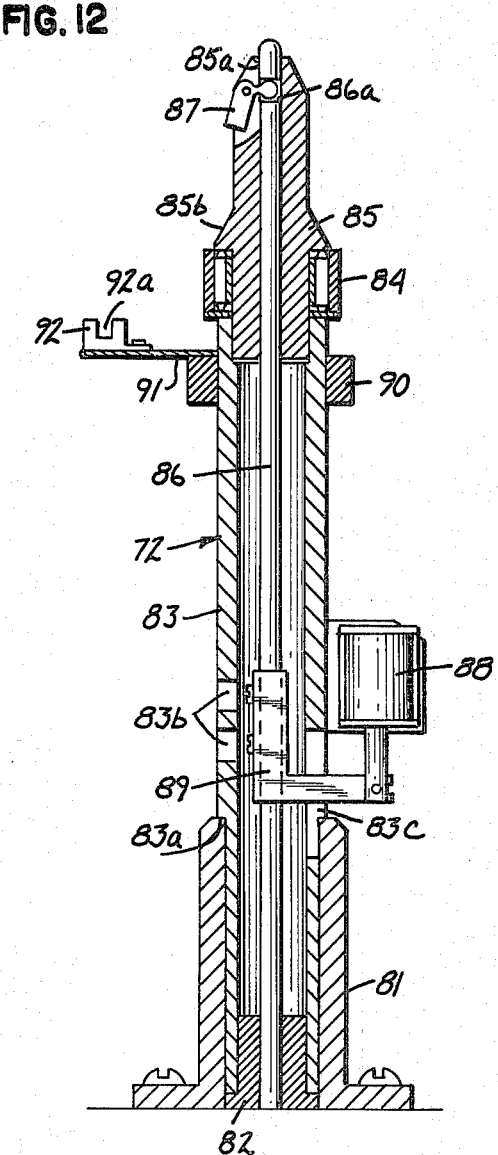
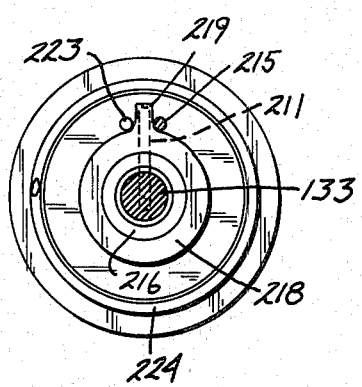
FIG. 25
FIG. 24
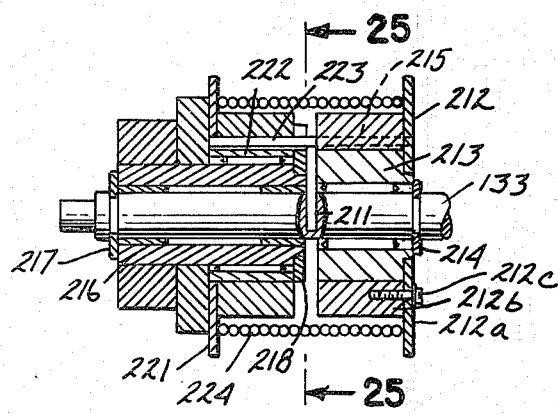

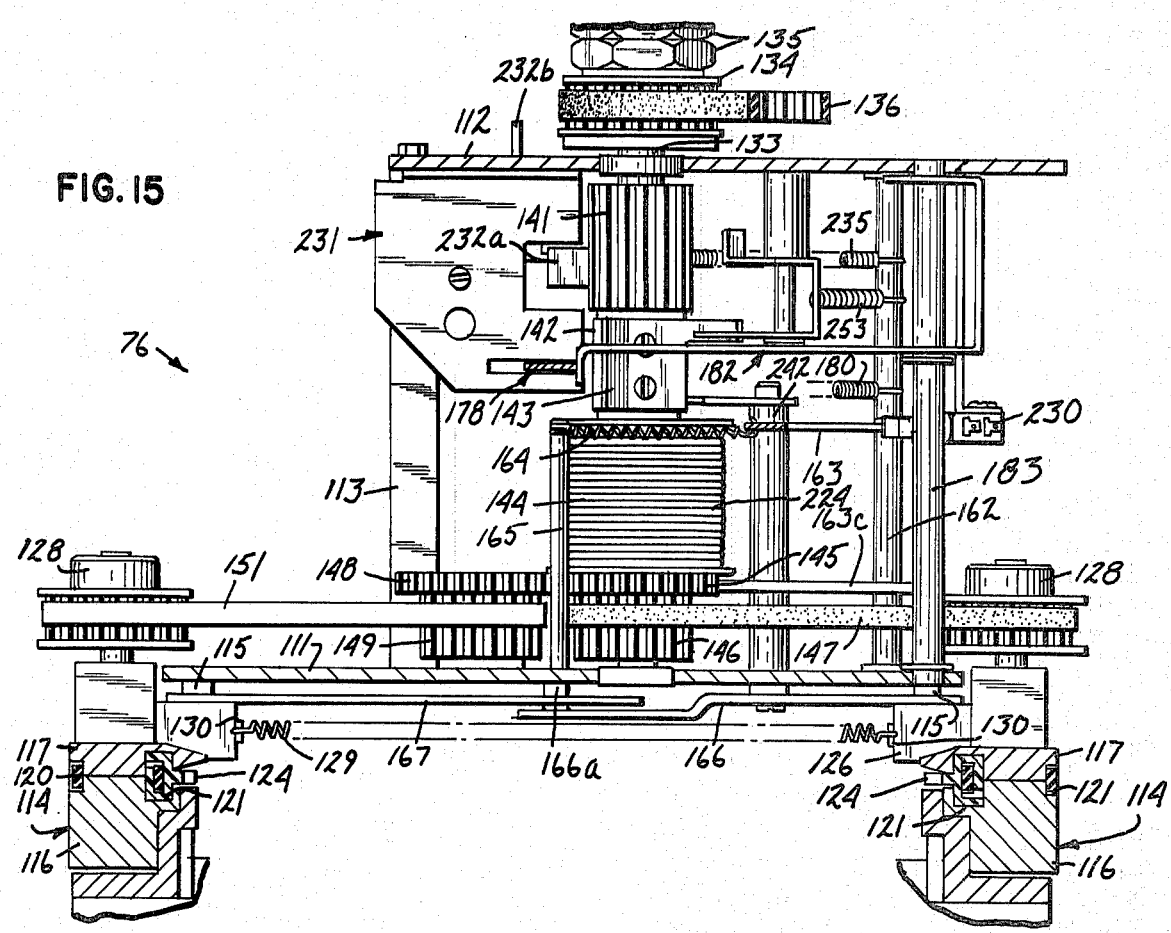
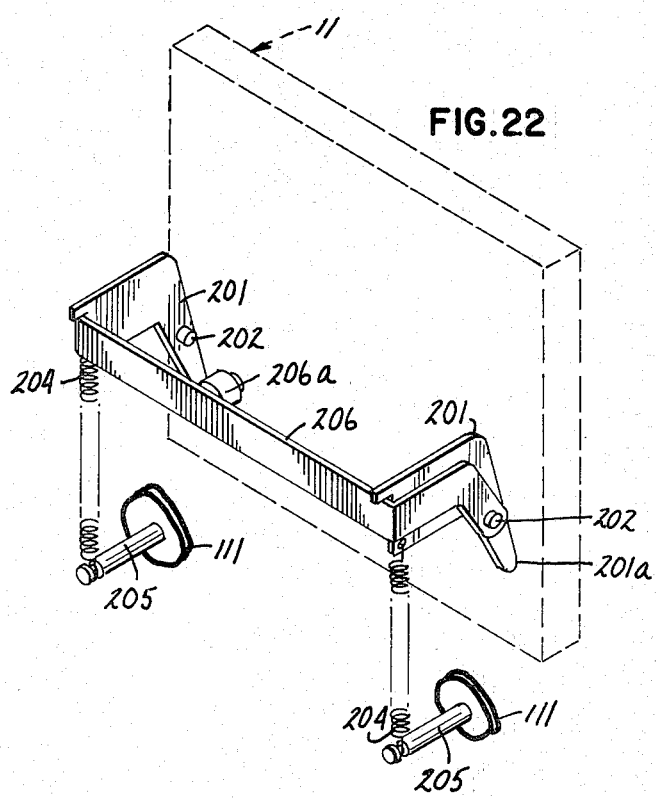
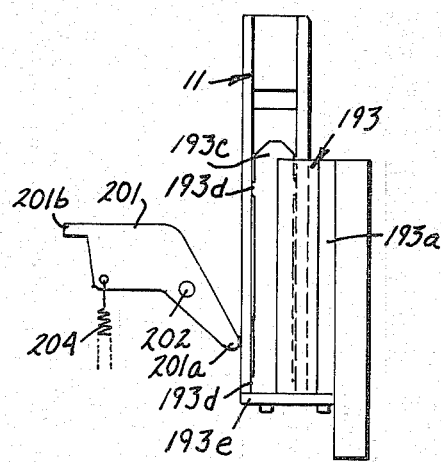

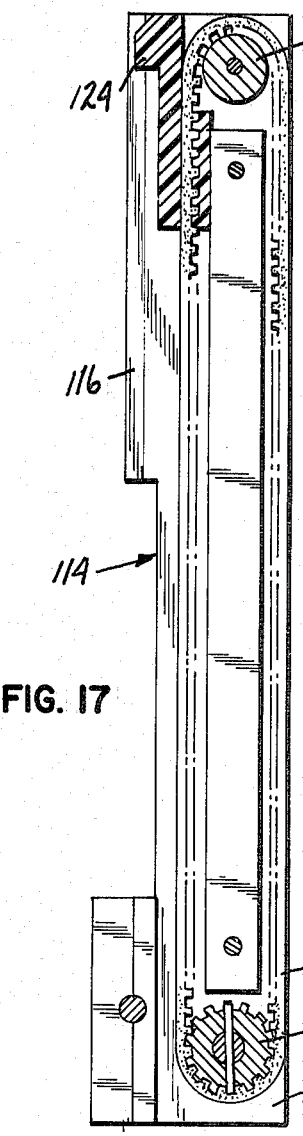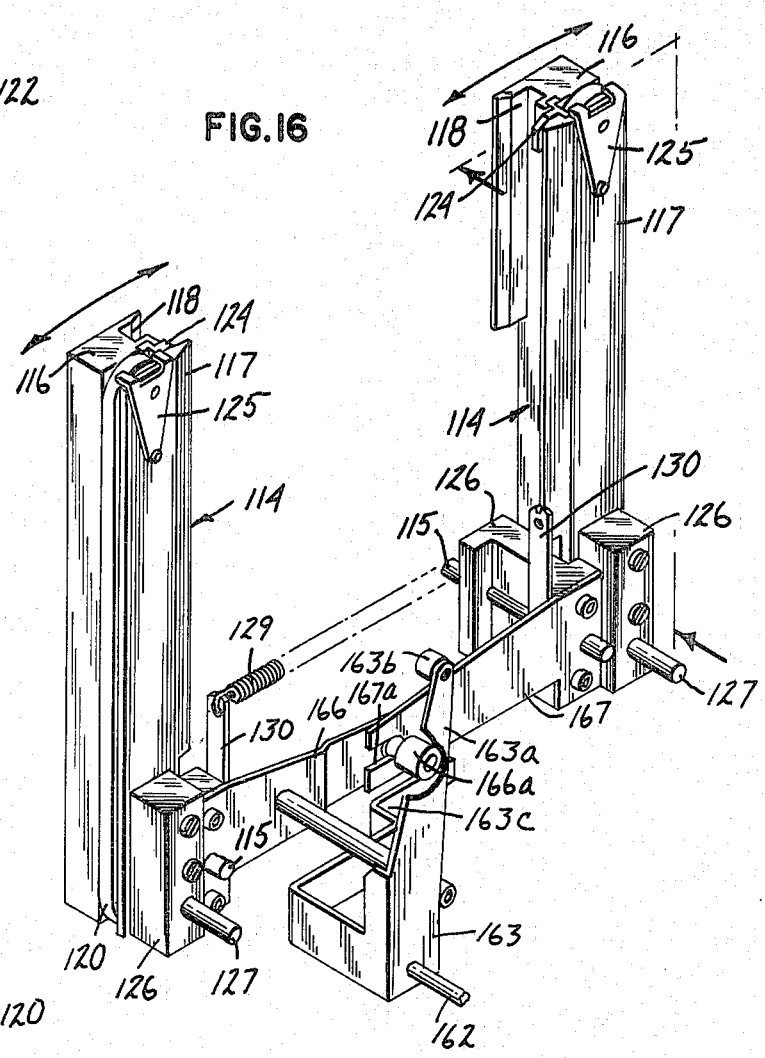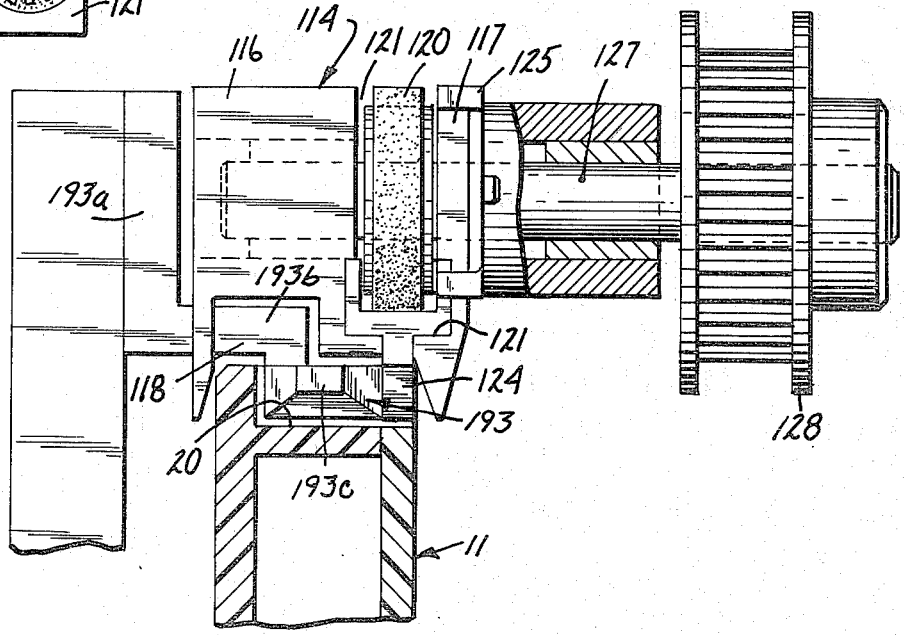

FIG.28
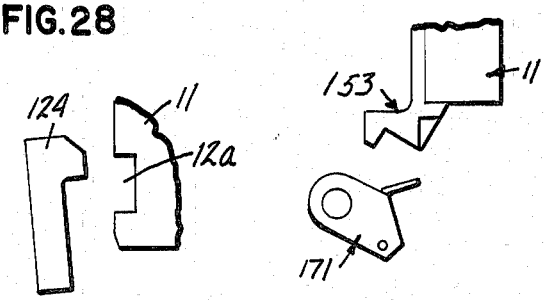
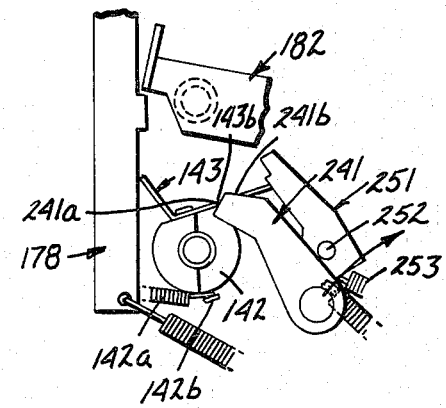
FIG.29
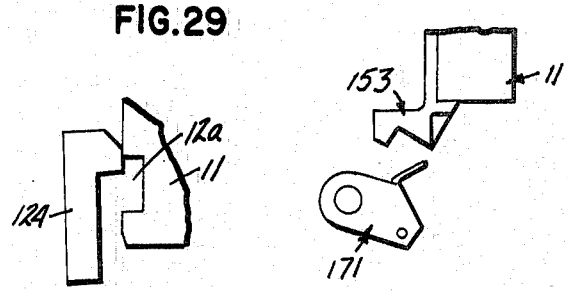
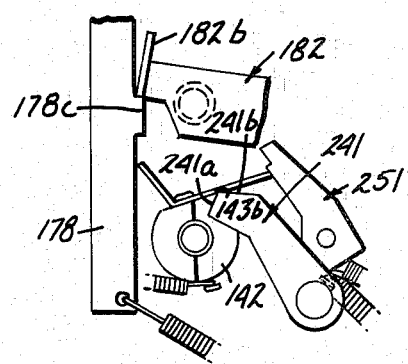
FIG.30
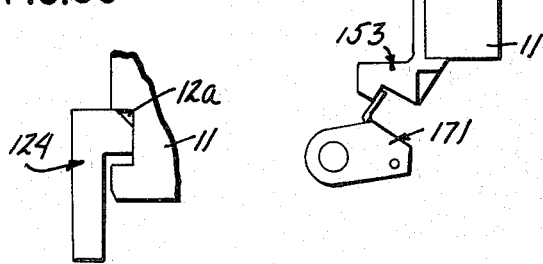
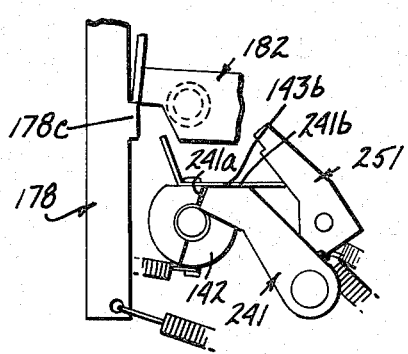
FIG.31
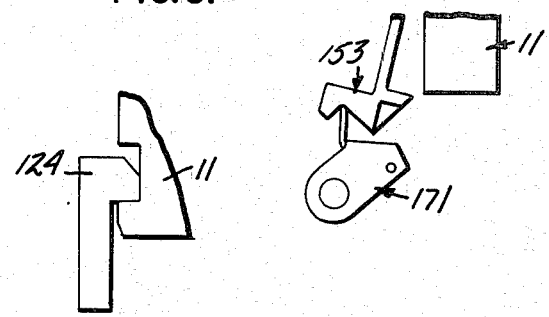
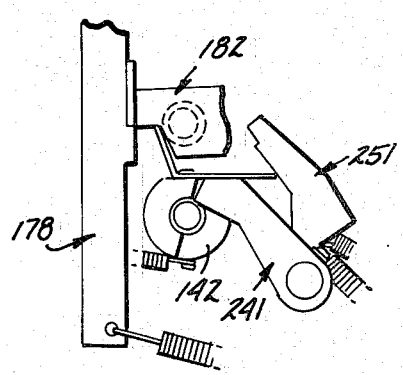

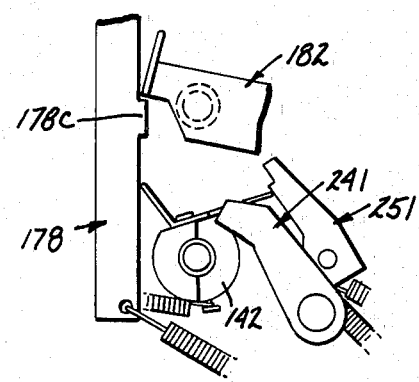
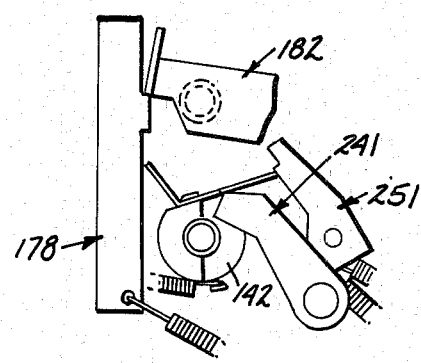

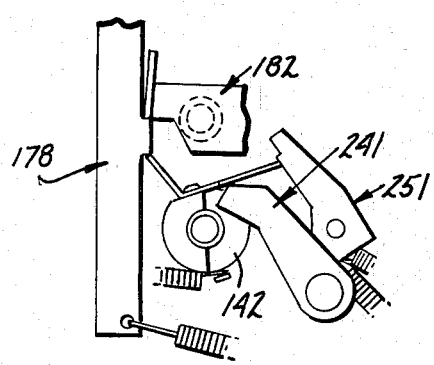
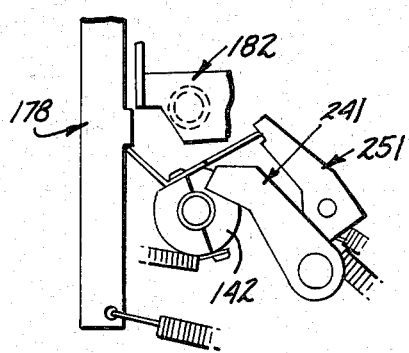

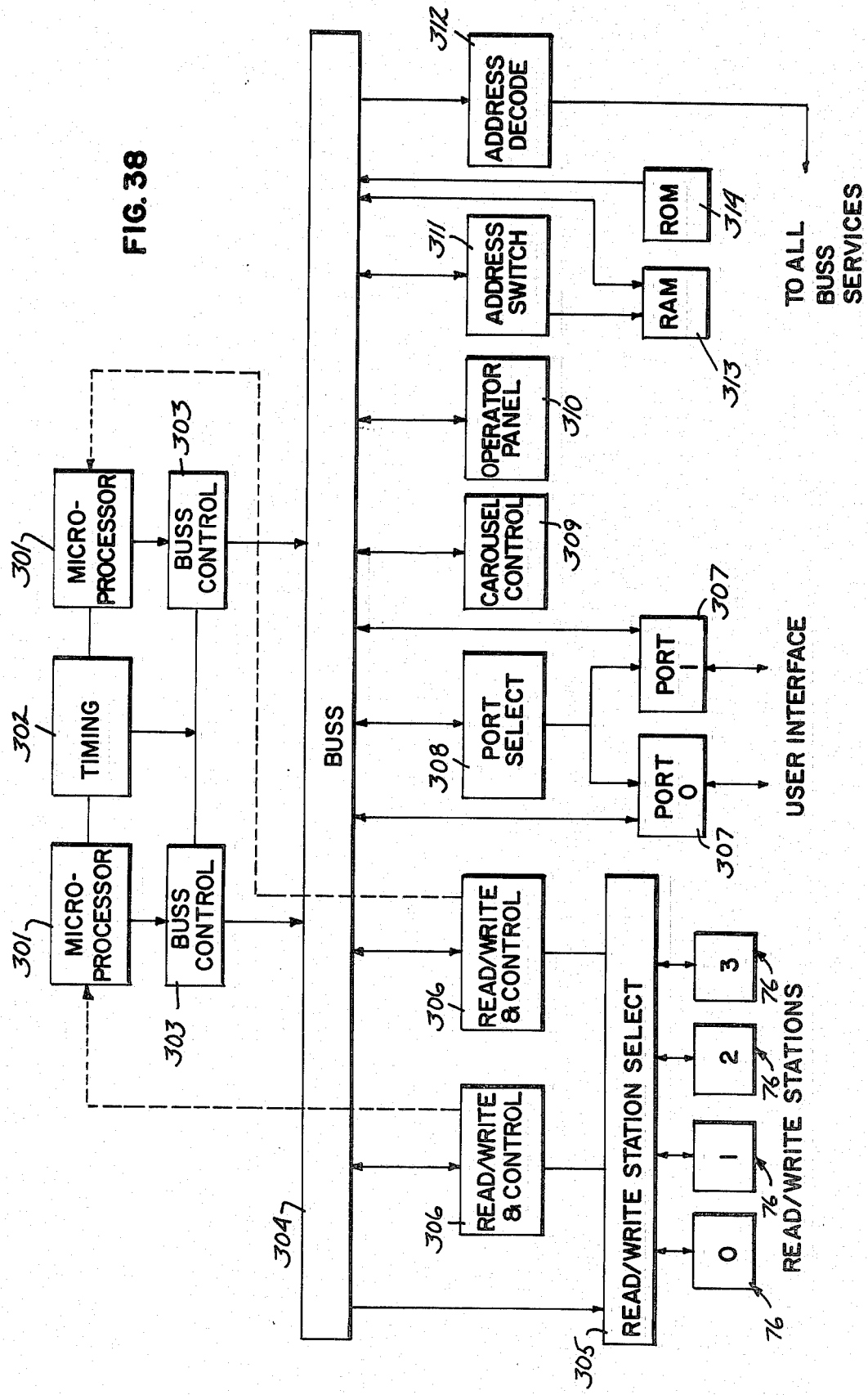

CAROUSEL TAPE SYSTEM

The invention generally relates to peripheral equipment for digital computers, and is specifically directed to carousel apparatus which houses a plurality of identical electromagnetic tape cartridges in radial fashion and is operable to effect a transfer of electromagnetic information between a selected cartridge and an accessed digital computer.

Various storage media and devices are available for the storage of data in electromagnetic form, and many types of peripheral equipment are capable of accessing a digital computer to a stored data base.

One example of a data storage device is the tape cartridge or cassette, which offers certain advantages over other data storage devices. Among these is the feature of the cartridge being fully self-contained, with the supply and takeup reels as well as the tape housed in a single protective cartridge. Because the tape never needs to be threaded from one reel to the other, the tape cartridge is quite easy to use and is relatively foolproof. Further, although the usage of a plurality of cartridges for a data base may increase the access time of a computer to a given cassette due to the inherent time delays in mechanical functions, this is not an important consideration in many applications. In fact, the independent operability of each cartridge and the interchangeability of cartridges within a given data base provides such a system with a degree of versatility which far outweighs the slower access time in most cases.

One particular tape cartridge, specifically developed by the Minnesota Mining and Manufacturing Company for computer applications and electromagnetic data storage, has been approved as an American National Standard by the American National Standards Institute. The cartridge uses a pulley and belt drive for simultaneous operation of both tape reels, and is operated by rotating a single, externally accessible capstan. With the exception of the capstan, the unit is entirely enclosed and includes a spring loaded access door that opens to permit contact of the tape with a read/write head. The standard cartridge is disclosed and claimed in U.S. Pat. No. 3,692,255.

This invention is specifically directed to apparatus which makes use of a plurality of these standard cartridges to form a data base, and which provides efficient access of external digital computer equipment with the data base. More specifically, the apparatus includes a carousel in which the plurality of cartridges are releasably held in a radial arrangement. The carousel is used in conjunction with a control housing having a plurality of read/write stations, and which is capable of indexing any cartridge in the carousel for use by any of the plurality of read/write stations. Once indexed, a cartridge is released from the carousel by the station mechanism, which then automatically carries the cartridge to a read/write position. Electromagnetic information can then be transferred between the cartridge and accessed computer through a selected one of a plurality of input/output ports.

As constructed, the apparatus is capable of automatically indexing, loading, processing and unloading a selected cartridge relative to a selected read/write station, and of independently operating all read/write stations simultaneously.

The individual cartridges can be added or removed from the carousel while the system is in operation, and the carousel itself is removable, thus enabling the data base to extend to a plurality of carousels. Based on a recording density of 1600 bpi and the utilization of four tracks on the quarter inch computer grade magnetic tape, and with 300 feet of tape per cartridge, each cartridge has a storage capacity in excess of 2 million bytes, and a fully loaded carousel has a storage capacity in excess of 33 million bytes.

The various structural and functional features will become more fully apparent from the specification, claims and attendant drawings.

BRIEF DESCRIPTION OF THE DRAWINGS

FIG. 5 is a view in top plan of a carousel in which a plurality of the cartridges are releasably held;

FIG. 6 is a view in bottom plan of the carousel;

FIG. 7 is an enlarged fragmentary sectional view showing the cartridge retaining gate of the carousel and the gate actuator of one of the station mechanisms;

FIG. 8 is a perspective view of a positioning ring forming part of the carousel;

FIG. 11 is a perspective view of one of a plurality of ribbed dividers forming part of the carousel, each of which defines a receiving slot and retaining gate for a cartridge;

FIG. 12 is a sectional view in side elevation of a center post assembly which revolvably supports and releasably locks the carousel onto the control housing;

FIG. 15 is a fragmentary view in top plan of the station mechanism with a number of components removed for purposes of clarity;

FIG. 16 is a perspective view of the transfer arm assemblies of the station mechanism with certain actuating components;

FIG. 17 is a transverse sectional view of one of the transverse arm assemblies taken along the line 17—17 of FIG. 16;

FIG. 22 is a perspective view of structure within the station mechanism for creating a lateral reference force against the cartridge in the read/write position;

FIG. 23 is a side view of the structure of FIG. 22;

FIG. 24 is a view in longitudinal section of a tensioner forming part of the drive to the cartridge pawls;

FIG. 25 is a transverse sectional view of the tensioner taken along the line 25—25 of FIG. 24;

FIG. 26 is an enlarged fragmentary view in top section of the cartridge, the cartridge pawl and pawl drive, and the cartridge guide structure;

FIGS. 28-31 are a sequential representation of the relationship of the gate actuating structure to pawl/cartridge position when the cartridge is properly indexed in the station mechanism;

FIG. 38 is a block diagram of the control circuitry for the carousel apparatus.

DESCRIPTION OF THE PREFERRED EMBODIMENT

Figure 1:
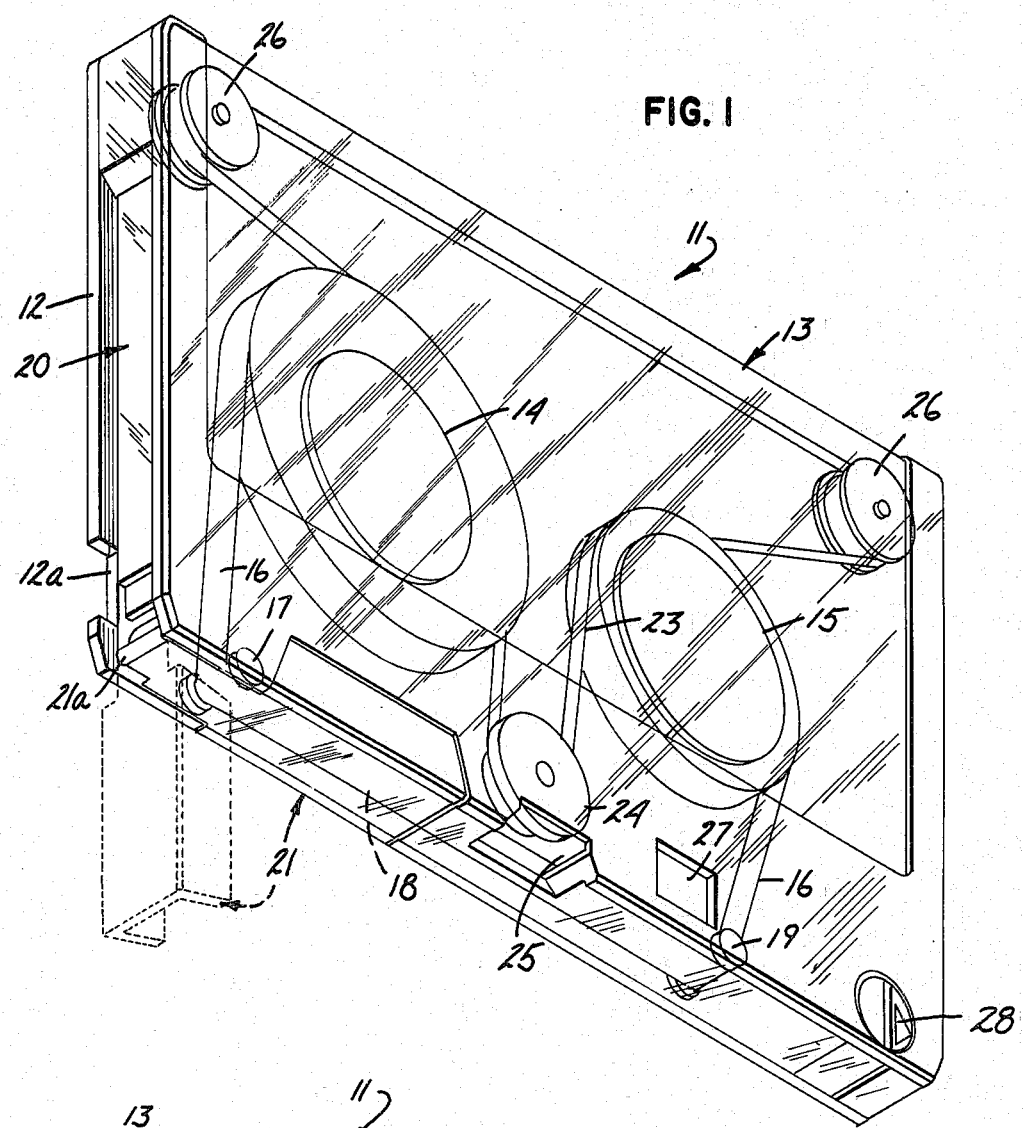
FIG. 1 is a perspective view of an electromagnetic tape cartridge used in connection with the inventive apparatus.
Figure 2:
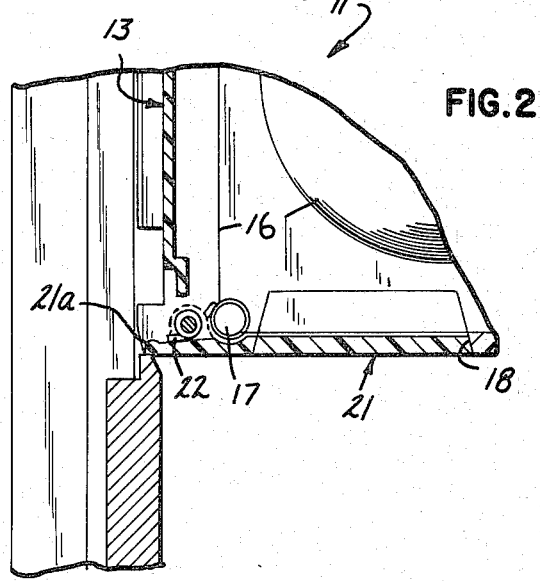
FIG. 2 is an enlarged fragmentary sectional view of the hinged access door of the cartridge.

With reference to FIGS. 1 and 2, a standard magnetic tape cartridge for information interchange is represented generally by the numeral 11. Cartridge 11 may be generally described as a rectangular, shallow box defined by an opaque back plate 12 and a transparent cover 13 which constitutes an integrally formed front plate, sides, top and bottom. Each of the sides of cartridge 11 defines a longitudinal recess 20 which together serve as guides for its sliding movement toward and away from a read/write head. Back plate 12 includes two rectangular notches 12a along its lower side edges which enable the cartridge 11 to be engaged and moved by a loading/unloading mechanism relative to a read/write head. There are no corresponding notches in the transparent front plate of the cover 13. Thus, the cartridge 11 is asymmetrical in nature, which precludes loading and unloading while in an improperly oriented position.

Cartridge 11 further comprises a tape supply hub 14 and tape takeup hub 15 mounted in coplanar relation. Magnetic tape 16 is unwound from the supply hub 14, passing around a first tape guide 17, through an external access opening 18 (FIG. 1), around a second tape guide 19 and then on to takeup hub 15.

A protective door 21 generally conforms in shape to the external access opening 18, and is pivotally mounted to the cartridge to provide access to tape 16 by a read/write head (not shown in FIGS. 1 and 2). Door 21 is normally biased to a closed position by a torsion spring 22 (FIG. 2), and is opened by engaging a rearwardly extending tab 21a.

The supply hub 14 and takeup hub 15 are driven by a tensioned, flat drive belt 23 which is endlessly moved by a belt capstan 24. Capstan 24 is externally accessible through an opening 25 to be driven by a drive roller (not shown in FIGS. 1 and 2).

Belt guide rollers 26 are rotatably mounted in each of the upper corners of cartridge 11. Drive belt 23 endlessly encircles the capstan 24 and each of the belt guide rollers 26, and by the disposition of supply hub 14 and takeup hub 15, necessarily engages the outer layer of magnetic tape of each in engaging relation. Thus, rotation of the belt capstan 24 by an external drive motor operating through a drive roller effects linear movement of the magnetic tape 16 relative to its access opening 18.

Cartridge 11 further comprises a window 27 relative to which an internal angular mirror (not shown) is mounted to sense a beginning-of-tape marker, an end-of-tape marker, a load point marker and an early warning marker. Cartridge 11 also includes a rotatable plug 28 which cooperates with the read/write mechanism to enable or prevent the writing operation, depending on its position.

Reference is made to U.S. Pat. No. 3,692,255 issued to Robert A. Von Behren on Sept. 19, 1972 and assigned to the Minnesota Mining and Manufacturing Company for further details on structure and operation of the cartridge 11.

Figure 3:
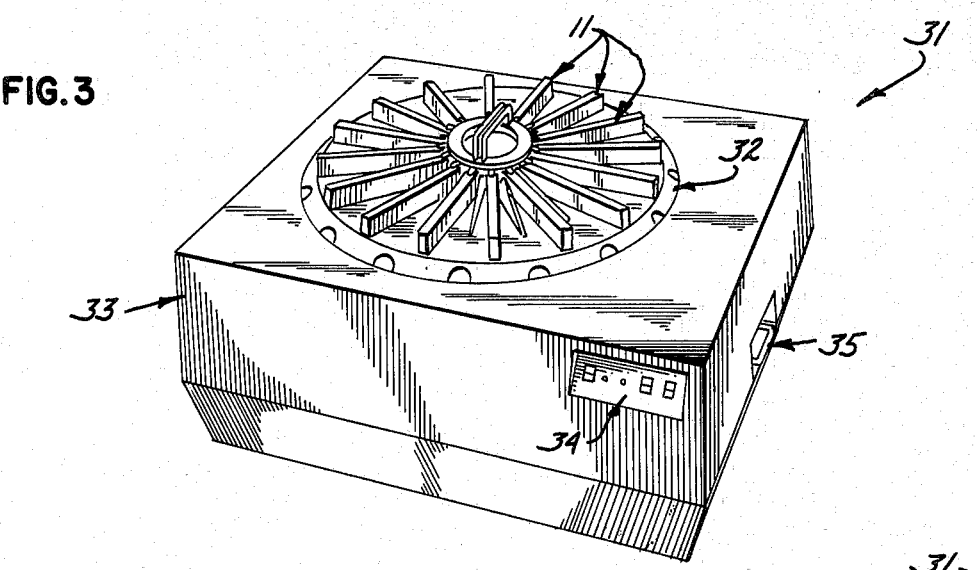
FIG. 3 is a perspective view of the inventive carousel apparatus.

FIG. 3 is a general perspective view of a carousel apparatus 31 capable of handling a plurality of the magnetic tape cartridges 11. Carousel apparatus 31 broadly comprises a carousel storage device 32 which receives and stores the individual cartridges 11, and a control housing 33 which receives and rotatably carries the carousel 32, and includes one or more read/write mechanisms with respect to which a selected cartridge 11 may be used, as described in further detail below. Housing 33 includes a control panel 34 which operates in conjunction with one or more microprocessors to control operation of the apparatus. Among other things, this operation includes the selection of a particular tape cartridge 11, positioning of the selected cartridge relative to a desired read/write mechanism, initiation of the cartridge load/unload cycle, as well as the read/write function itself.

As indicated by the handle 35, housing 33 is entirely portable, with or without the carousel storage device 32.

The carousel storage device 32 is shown in detail in FIGS. 5-11. The carousel 32 is removable from the housing 33, thus performing the function of an information storage device, any number of which may be used in connection with the system.

Carousel 32 is of circular configuration and specifically designed to receive and carry sixteen of the magnetic tape cartridges 11. More specifically, carousel 32 is defined by a top circular plate 42 in which 16 radially disposed recesses 43 are formed to receive the cartridges 11. The central region of the top circular plate 42 is recessed, as shown at 44, and an irregularly shaped, central opening 45 is formed to fit over and cooperate with a supporting center post assembly, as discussed in detail below.

Figure 9:
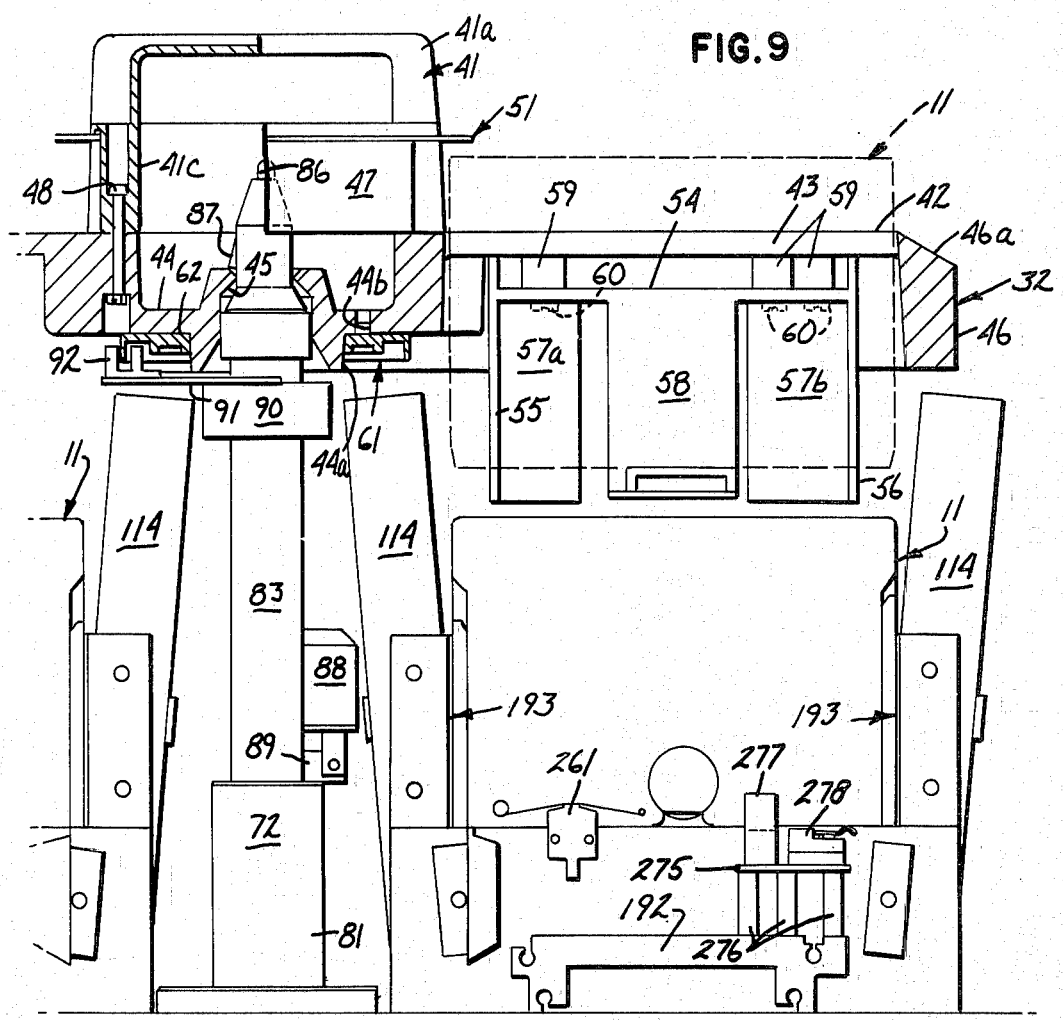
FIG. 9 is a partial view of the carousel apparatus, portions shown in section and other portions shown in outline form, and particularly showing the relationship of each of the station mechanisms to the carousel and cartridges.
Figure 10:
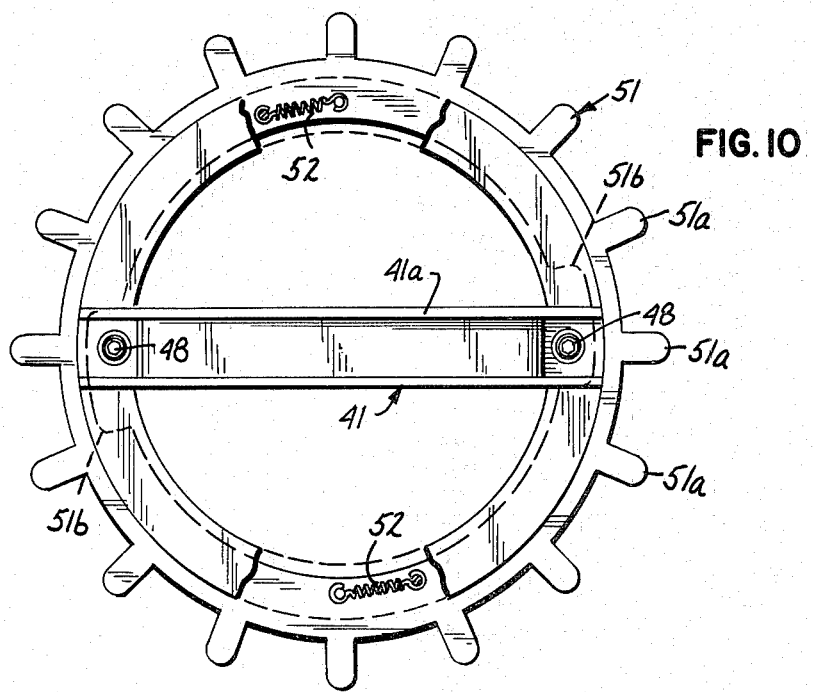
FIG. 10 is a view in top plan of a cartridge retaining ring forming part of the carousel.

Formed integrally with the top circular plate 42 is a downwardly projecting peripheral flange 46 of substantial cross section (FIG. 9). The top surface of the peripheral flange 46 is chamfered, as shown at 46a; and, as shown in FIGS. 3 and 5, the flange 46 is formed with sixteen semicircular notches 46b which are circumferentially spaced in staggered relation with respect to the radial cartridge recesses 43.

As shown in FIG. 9, the carousel 32 further includes an integral cylindrical projection 47 that extends upwardly from the circular plate 42 and acts as a supporting structure for a handle assembly 41. With additional reference to FIG. 3, it will be seen that handle assembly 41 is a composite structure, defining a handle 41a, a flat ring 41b from which the handle 41a projects, and a downwardly extending cylindrical projection 41c which fits snugly within the confines of the upwardly extending cylindrical projection 47. A pair of nut and bolt assemblies 48 secure the handle structure 41 to the top circular plate 42.

As also shown in FIG. 9, a gap is defined between the ring 41b and top edge of projection 47, and a cartridge retaining ring 51 is retainably disposed in this gap. With additional reference to FIGS. 3, 5 and 10, retaining ring 51 includes a plurality of radially projecting teeth 51a conforming in number to the number of cartridge recesses 43. The ring 51 further includes two diametrically opposed circumferential notches 51b which are sized and disposed to permit limited rotation of the ring 51 relative to the handle 41. As will be apparent from FIG. 5, the degree of rotation of the ring 51 is chosen so that the projecting teeth 51a are movable between a first position overlying the recesses 43 and precluding removal of the cartridges 11, and a second position permitting removal of the cartridges 11.

The ring 51 is normally biased to the recess blocking position by a pair of coil springs 52 (FIG. 10) which act between the ring 51 and the cylindrical projection 47. The ring 51 is manually rotated to the nonretaining position, and returns to the blocking position upon release.

As viewed from the bottom of the carousel 32, the top circular plate 42 with its central recess structure 44 and the outer peripheral flange 46 together define an annular receptacle, the radial dimension of which generally corresponds to the longitudinal dimension of the cartridge recesses 43. To provide an understructure for the carousel 32 which is capable of holding each of the cartridges 11 in a position represented by the dotted line in FIG. 9, there is provided for each of the recesses 43 a ribbed divider represented generally by the numeral 53 (FIGS. 6, 9 and 11). As best shown in the bottom plan of FIG. 6, each of the ribbed dividers 53 is generally wedge shaped and occupies the space between adjacent cartridge bases 43. As best shown in FIG. 11, each of the ribbed dividers 53 consists of a generally wedge-shaped top plate 54, an inner end plate 55, an outer end plate 56 of irregular shape, and vertical ribs 57a, 57b.

The ribbed divider 53 further comprises a cartridge retaining gate 58 which projects vertically downward from the wedge-shaped plate 54 in cantilever fashion. The retaining gate 58 is constructed and arranged so that it has an amount of lateral resilience at its lower end. With additional reference to FIG. 7, it may be seen that the retaining gate 58 is formed with a retaining foot 58a at its extreme lower end, which projects laterally outward to catch and retain the bottom of a cartridge 11. Projecting inwardly from the lower end of gate 58 is a member 58b, which can be engaged by a mechanism described in detail below to laterally flex the gate 58 and enable the release of a retained cartridge 11. The resilient nature of the gate 58 causes it to return to its normal retaining position upon release by the gate actuator mechanism.

Each of the dividers 53 is secured to appropriately spaced studs 59 projecting downwardly from the plate 42 with screws 60 (FIG. 9), and the dividers 53 together represent a composite understructure for the carousel 32 that offers excellent strength while maintaining the overall carousel weight at a low level for portability.

Preferably, each of the recesses 43 is identified by numerical indicia formed on the chamfered edge 46a. These numerical indicia give the cartridge spaces 43 visual uniqueness within the carousel 32, permitting an operator to place a selected cartridge 11 in a specific recess 43. The visual uniqueness of the carousel 32 has a mechanical counterpart which enables the control apparatus to determine and thereafter control the angular position of the carousel 32 within the control housing 33.

This mechanical counterpart takes the form of a positioning ring 61 which forms part of the carousel 32, and which is specifically shown in FIGS. 6, 8 and 9. Positioning ring 61 has an annular top surface 62, which, as best shown in FIG. 9, fits against the flat bottom surface opposite the recessed structure 44 of plate 42. The inside diameter of ring 61 corresponds to the outside diameter of a downwardly extending axial projection 44a which defines the lowermost and largest region of the irregular central opening 45. The ring 61 has four circumferentially spaced screw holes 63, and it is secured to the underside of the recessed structure 44 with screws 64.

The position uniqueness of ring 61 resides in a thin, axially extending peripheral flange 65. A pair of slots 65a is provided in the flange 65 for each of the cartridge slots 43 which bear the numerical indicia 1–16. As shown in FIG. 8, the slots 65a are of uniform width, and there is uniformity in their circumferential spacing. For the "home" position, which corresponds to numerical indicia 1, a pair of slots 65b is provided, each of which has a significantly greater width than that of the slot 65a. As will be discussed below, the wider slots 65b permit an optical sensor to determine the "home" position of the carousel 32 on the control housing 33 by initially sensing the position of slots 65b.

The position of ring 61 with respect to the carousel 32 must, of course, correspond to the reference indicia, and this is provided by a stud 66 which is radially aligned with the slots 65b and projects upward from the planar surface 62. Stud 66 cooperates with an opening 44b (FIG. 9) formed in the recessed structure 44.

Figure 4:
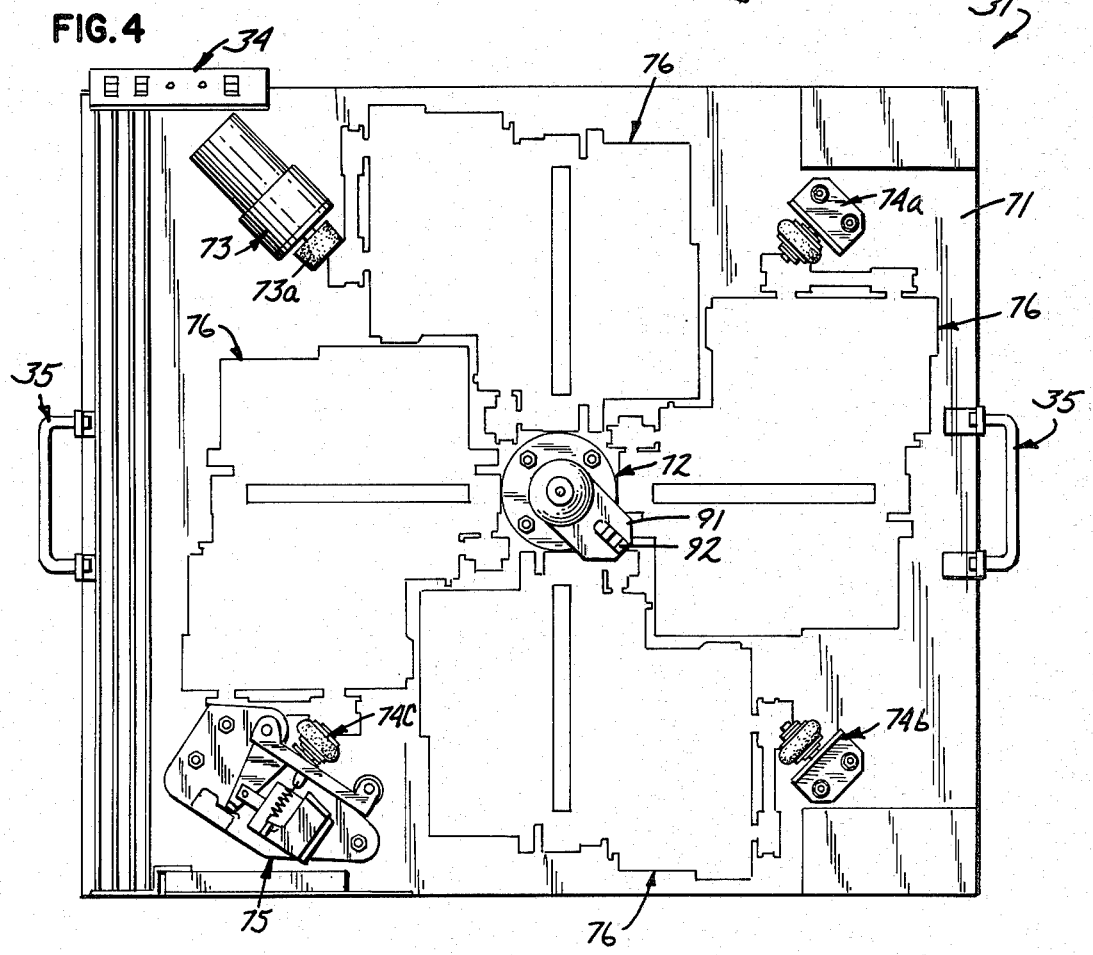
FIG. 4 is a view in top plan of the carousel apparatus with portions thereof removed and with a plurality of read/write stations shown in outline form, and showing in particular portions of the carousel indexing mechanism.

The control housing 33 contains all apparatus necessary for the desired operation of the carousel 32 and the individual cartridges 11. FIG. 4 is a sectional view in top elevation of the control housing 33 with the carousel 32 removed, and specifically showing the layout and relative positions of the internal control apparatus. This control apparatus is mounted to a base plate 71 either directly or by appropriate brackets and other mounting structures (not shown) which are carried by the base plate 71.

A center post assembly represented generally by the numeral 72 is mounted to base plate 71 for receiving and rotatably carrying the carousel 32. The carousel 32 is rotated by a drive motor 73 having a drive wheel 73a formed from resilient, frictional material. Drive wheel 73a drivingly engages the bottom surface of the peripheral flange 46 of carousel 32.

The carousel is held in a stable horizontal position during rotation by support wheel assemblies 74a–74c, which are mounted in a horizontal plane in opposed, circumferentially spaced relation. Support wheel 74c forms part of an indexing mechanism represented generally by the numeral 75, which cooperates with the drive motor 73 to position the carousel 32 in any of the sixteen positions.

The control housing 33 further includes four station mechanisms 76, each of which is shown in phantom for purposes of clarity. The broad function of each station mechanism 76 is to release an indexed cartridge 11 from the carousel 32, to lower the cartridge to a read/write position relative to a magnetic tape head, to move the tape relative to a read/write head, and to return the cartridge to its proper position within the carousel 32. It will be appreciated that the apparatus 31 will operate with only a single station mechanism 76, but that the versatility of the apparatus 31 may be significantly expanded through additional station mechanisms numbering up to four, as shown.

The center post assembly 72, which includes an optical sensor for the position ring 61, is shown in detail in FIG. 12. Assembly 72 consists of a base member 81 which is mounted directly to and projects axially upward from base plate 71. Base member 81 defines an axial socket in which a stepped bearing member 82 is received. An annular gap is defined between bearing member 82 and base member 81, which gap receives the lower end of a longitudinal tube 83. Tube 83 is also stepped, including an annular shoulder 83a which rests on the top edge of base member 81. Tube 83 has a pair of access openings 83b formed through its side, and an axially extending elongated opening 83c is formed generally opposite the springs 83b, the purpose of which will be discussed below.

A roller bearing assembly 84 rests on top of tube 83 and is held in place by a nose member 85, the lower end of which is frictionally inserted into the upper end of tube 83. The outer diameter of bearing assembly 84 is chosen to accommodate the central opening 45 of carousel 32, thus permitting the carousel 32 to freely rotate relative to the center post assembly 72, while at the same time being supported in a horizontal plane of rotation by drive wheel 73a and idler wheel assemblies 74a-74c.

Nose member 85 is formed with a central axial opening, and, with bearing member 82, acts as an axial guide to a locking rod 86. Rod 86 is the longest member of the center post assembly 72, projecting slightly above nose member 85 in its lowest position.

Nose member 85 is formed with an arcuate recess 85a in which a latch pawl 87 is pivotally mounted. Latch pawl 87 is generally L-shaped, with one leg disposed generally vertically for swinging movement into and out of the recess 85a. The shorter leg end defines a circular bearing member that is received within a recess 86a formed at the top of locking rod 87. As such, the pawl 87 acts as a bell crank, and up and down movement of the rod 86 causes its vertical leg to move in and out of the recess 85a. As best shown in FIG. 9, outward swinging movement of the latch pawl 87 causes it to retainably engage the upper edge of the central recessed structure 44, thus locking carousel 32 onto the center post assembly 72.

Nose member 85 is formed with a tapered surface 85b above the bearing assembly 84 which assists in centering the carousel 32 onto the bearing assembly 84.

Axial movement of the rod 86 to lock and unlock the pawl 87 is effected by a solenoid 88 having a plunger 88a that is pivotally connected to an L-shaped link 89. The laterally extending leg of the link 89 projects through the elongated opening, and the vertical leg is secured to locking rod 86 by a pair of screws which are accessible through the openings 83b. Solenoid 88 is normally biased to the lock position shown in FIG. 12, and energization of the solenoid 88 moves the rod 86 axially upward to retract the link 87, which unlocks the carousel 32 from center post assembly 72.

A collar 90 is secured to the tube 83 at a position slightly below the bearing assembly 84. Collar 90 supports a laterally extending mounting plate 91 (FIGS. 4, 9 and 12), the outer end of which carries a sensor 92. With reference to FIG. 9, the sensor 92 defines a gap 92a which receives the peripheral flange 65 of position ring 61. Sensor 92 comprises a light source and a photosensor mounted in opposed relation, which permits it to sense the presence and character of slots 65a and 65b. The sensed information is passed onto the unit microprocessor through means not shown, where it is utilized for positioning the carousel 32 relative to the station mechanisms 76.

Figure 13:
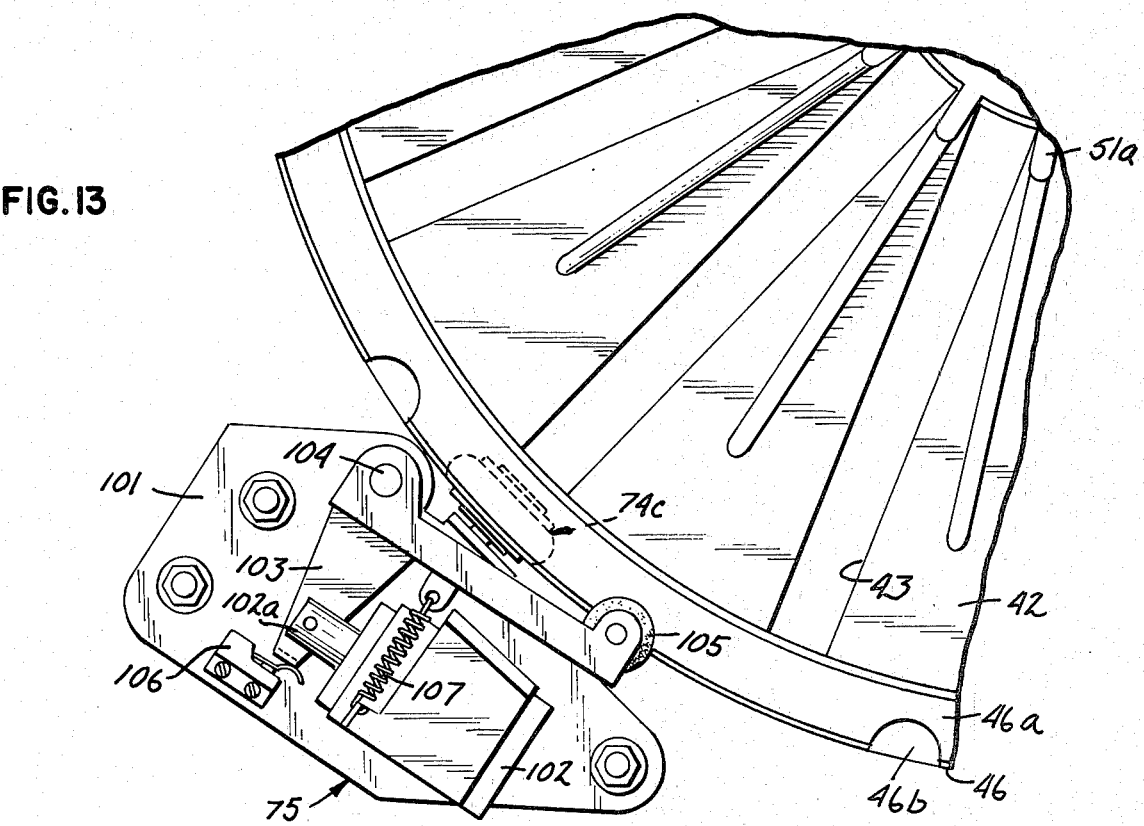
FIG. 13 is an enlarged view in top plan of part of the carousel and carousel indexing mechanism.

As mentioned above, positioning of the carousel 32 relative to a station mechanism 76 is accomplished by cooperation of the drive motor 73 and indexing mechanism 75, the latter of which is shown in detail in FIG. 13. Index mechanism 75 comprises a base bracket 101 on which a solenoid 102 is mounted. Solenoid 102 includes a plunger 102a, the end of which is pivotally connected to one leg of a generally L-shaped bell crank 103. Bell crank 103 is pivotally connected at the juncture of its legs to base bracket 101 by a pivot pin 104. As such, the free end of bell crank 103 may be moved toward and away from the peripheral flange 46 of carousel 32 by energization of indexing solenoid 102.

The free end of bell crank 103 carries a roller 105 which is sized to fit into the semicircular notches 46b in retaining engagement. Solenoid 102 is normally biased with the plunger 102a in an extended position so that the indexing wheel 105 is normally retracted from engagement with peripheral flange 46. This biasing function is provided by a spring 107 that is mounted in tension between the bell crank 103 and the side of solenoid 102. Energization of solenoid 102 causes the indexing wheel 105 to engage the outer periphery of flange 46 until it falls into one of the notches 46b, at which time the opposite end of the bell crank 103 engages a microswitch 106. The signal generated by actuation of the microswitch 106 is utilized by the microprocessor to stop drive motor 73, as will be described in greater detail below.

The notches 46b and indexing wheel 105 are relatively positioned so that each of the sixteen stopping positions of carousel 32 will place one of the cartridge recesses 43 (and the cartridge 11 which it carries) directly over one of the station mechanisms 76.

Once a selected cartridge 11 has been indexed relative to a selected station mechanism 76, the station mechanism 76 can be operated to perform the desired function, whether it be cartridge loading or unloading, the reading of data from the cartridge tape for processing, or the writing or recording of data on the tape. In this regard, the station mechanism is not concerned with the actual use of data which its read/write head senses and communicates, or the character of data which it receives from an outside source for communication and storage on the cartridge tape. Thus, it serves the function of an input/output device, occupying an interfacing position between the data storage medium and the data processing equipment.

The function of each station mechanism 76 consists of actuation of the retaining gate 58 of the selected cartridge 11, moving the cartridge downward into a read/write position or station entirely below the carousel, providing reference forces which align the cartridge tape relative to the read/write head to insure the accuracy of information transfer, the transfer of data to or from the cartridge, and elevation of the cartridge to its proper place within the carousel. Each station mechanism 76 is also capable of aborting the process if a cartridge has been improperly placed in the carousel or not properly received by the station mechanism itself.

Figure 14:
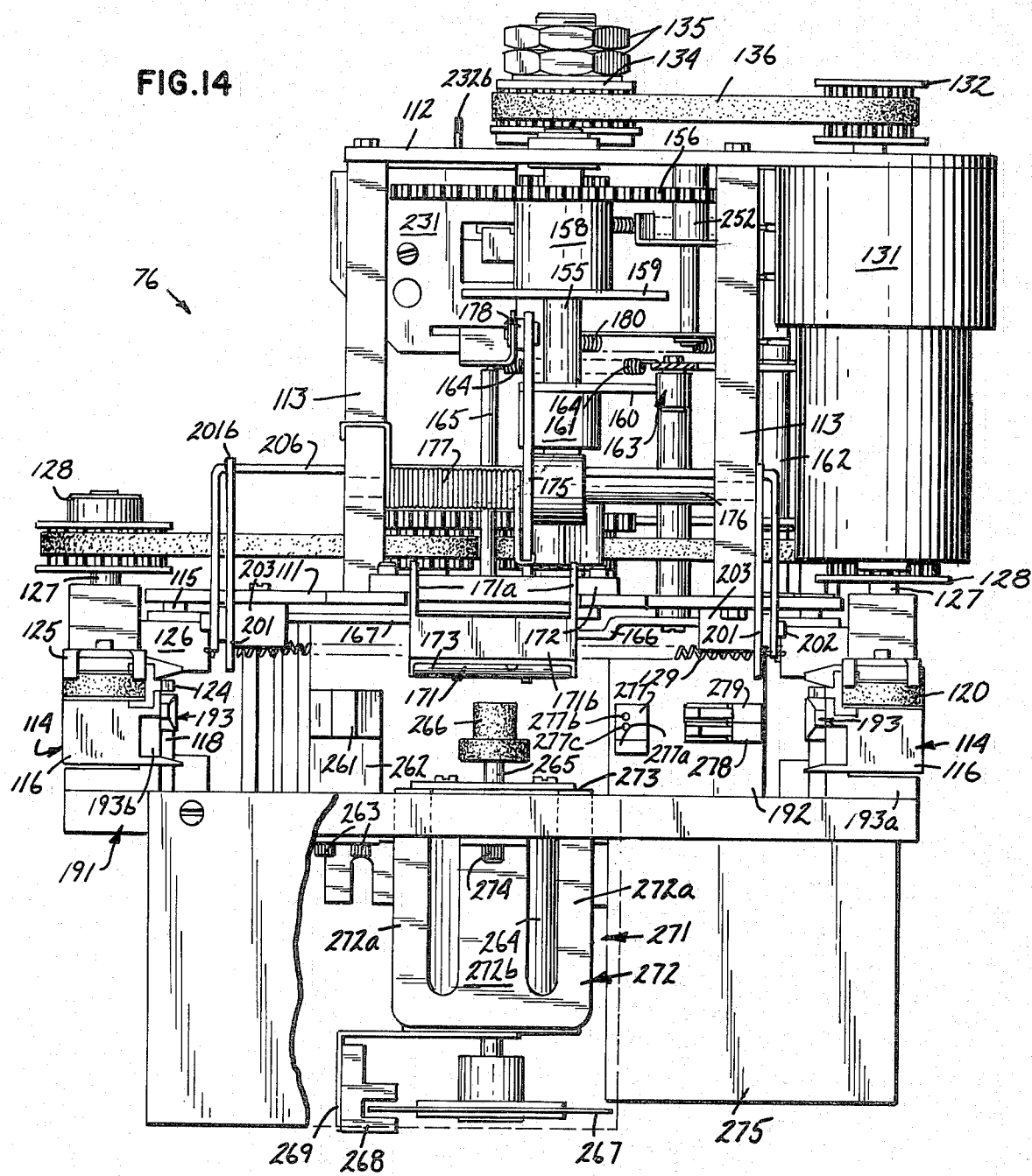
FIG. 14 is a view in top plan of one of the station mechanisms with certain portions thereof broken away.

With reference to FIGS. 14 and 15, each of the station mechanisms 76 comprises a frame having vertical side plates 111, 112 that are held in parallel spaced relation by four corner cross supports 113, the upper two of which can be seen in FIG. 14, with the lower two in FIG. 15. With additional reference to FIGS. 9 and 14–17, a pair of generally vertical transfer arm assemblies 114 are pivotally connected to the lower outer face of plate 111 by pins 115 in a manner which permits them to swing between cartridge "engage" and "release" positions. To this end, the transfer arm assemblies 114 are spaced apart so that, in vertically parallel relation (i.e., the cartridge "engage" position), the effective distance between them corresponds to the width of a tape cartridge 11. The degree of swing of the upper ends of the transfer arm assemblies 114 is sufficient to permit release of the tape cartridge 11, as well as to allow the carousel 32 to pass between the transfer arm assemblies 114 during its rotation. The transfer arm assemblies 114 are mirror images of each other (and are sometimes referred to as "righthand" or "lefthand"), each comprising first and second elongated extrusions 116, 117 bolted or otherwise secured together to define opposed, vertically elongated cartridge receiving slots 118. The juncture between extrusions 116, 117 also defines a vertical recess 121 that extends around the entire periphery of the extrusions. An endless toothed belt 120 is disposed within the recess 121, movably carried at its upper end by an idler gear wheel 122 and at its lower end by a drive gear wheel 123. A pawl 124 having a plurality of position retaining teeth is carried by the belt 121, the pawl 124 being vertically movable with travel of the belt 121 within a part of the cartridge receiving slot 118. A retaining clip 125 is mounted at the top of extrusion 117 to act as an upper limit to the pawl 124.

Each of the transfer arm assemblies 114 also consists of an irregularly shaped block member 126 mounted at the bottom of the extrusions 116, 117. The blocks 126 provide a number of mounting functions for the transfer arm assemblies 114, among them the receipt of pivot pins 115. A small rotatable shaft 127 projects horizontally from the mounting block 126, extending into the lower part of the transfer arm assembly 114 where it receives the drive gear wheel 123. A gear pulley 128 is secured to the end of shaft 127 by set screws or the like to effect travel of the belt 121 and pawl 124, as will be discussed in further detail below.

The transfer arm assemblies 114 are normally biased together by a coil spring 129 disposed in tension between a pair of vertical spring holders 130 mounted on opposed faces of the blocks 126 (FIGS. 15 and 16).

The mechanisms disposed between the frame plates 111, 112 serve to actuate the cartridge gate 58 to permit cartridge entry into the station mechanism 76, to move the transfer arm assemblies 114 between the cartridge release and engage positions, to move the pawls 124 up and down for movement of a selected cartridge 11 from the carousel 32 to the read/write head, to bias the cartridge 11 relative to the read/write head, and to abort the operation if the cartridge 11 is not properly oriented relative to the transfer arm assemblies 114.

All of these operations are powered by a single 12 volt reversible D.C. motor 131 (FIG. 14) that is mounted on a horizontal position to the frame plate 112. The output shaft of motor 131 projects externally through plate 112, and a gear drive pulley 132 is secured thereto.

A drive shaft 133 is journaled between the frame plates 111, 112 by suitable bearings, and in parallel relation to the output shaft of motor 131. Drive shaft 133 projects externally of the frame plate 112 in a position which is generally centered within the plate but below gear pulley 132. A driven slip clutch 134 is mounted on the outer end of shaft 133 and secured in aligned relation with the gear pulley 132 by a pair of lock nuts 135. A drive belt 136 extends between the gear pulley 132 and slip clutch 134. Slip clutch 134 is of conventional design, transferring rotational energy to the shaft 133 except in the presence of an excessive load, in which case it simply rotates relative to the shaft 133 under the influence of motor 131.

Figure 19:
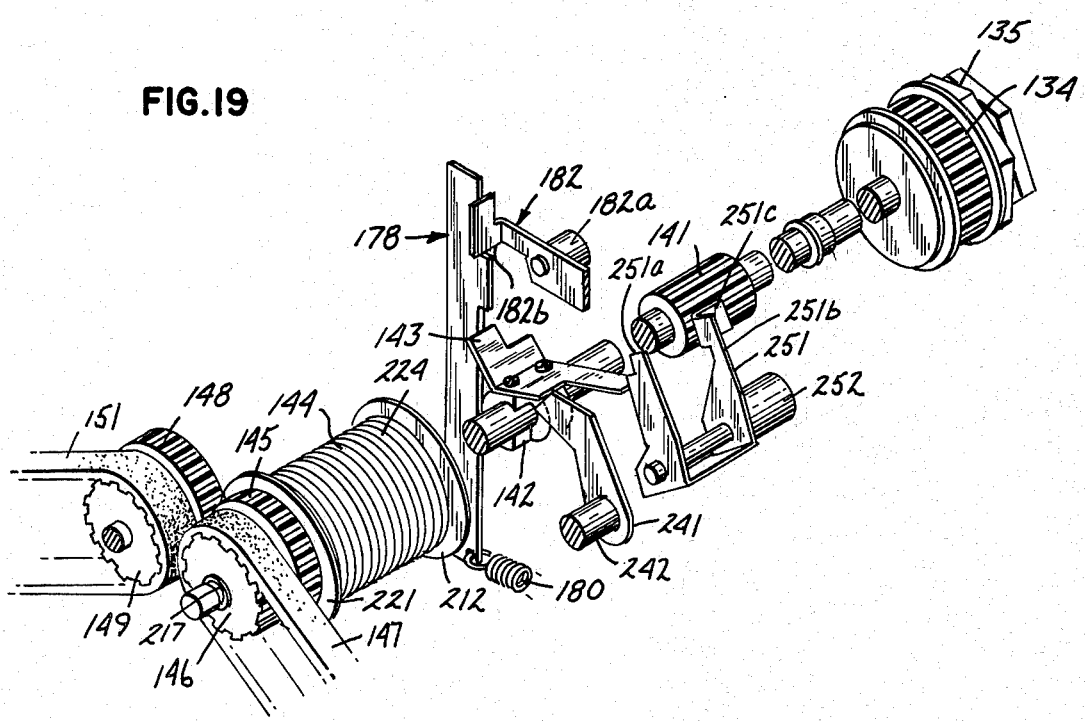
FIG. 19 is an enlarged perspective view of the station mechanism drive shaft, drive gear and clutch, gate actuating structure and pawl drive structure.

With additional reference to FIG. 19, a drive gear 141 is secured to the shaft 133 immediately inside the frame plate 112. Mounted adjacent the drive gear 141 is an interposer hub 142 carrying an L-shaped interposer 143, the purpose of which will be described below.

Adjacent the interposer hub 142 is a tensioner 144 which forms part of the drive train, as will be discussed below. On the opposite side of tensioner 144 is a first synchronizing gear 145 and gear pulley 146, the latter of which is disposed in alignment with the gear drive pulley 128 of the righthand transfer arm assembly 114. A timing belt 147 operatively connects the gear pulleys 128, 146.

A second synchronizing gear 148 and associated gear pulley 149 are mounted on a stub shaft 150 that projects from frame plate 111 parallel to drive shaft 133. The synchronizing gears 145, 148 are identical, and the former drives the latter to insure identical rotational velocities of the gear pulleys 146, 149. Gear pulley 149 is disposed in alignment to the gear pulley 128 of the lefthand transfer arm assembly 114, and a timing belt 151 operatively interconnects the two.

The synchronized rotational movement of the gear pulleys 146, 149 is carried through the timing belts 147, 151 to the gear pulleys 128 of the lefthand and righthand transfer arm assemblies 114, which in turn causes synchronized vertical movement of the pawls 124 to move the selected cartridge up and down in the proper reference position. As will become apparent below, downward movement of the pawls 124 follows actuation of the cartridge gate and inward movement of the transfer arm assemblies 114. Upward pawl movement begins the unload cycle.

Figure 18:
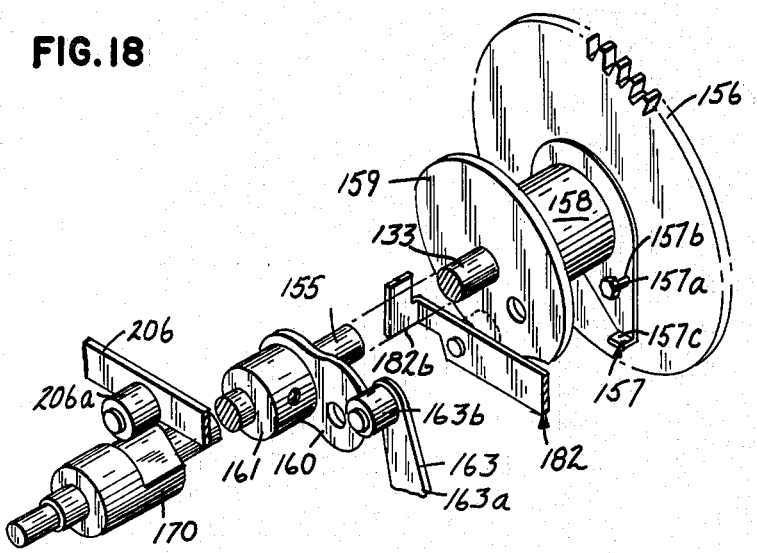
FIG. 18 is an enlarged perspective view of the station mechanism cam shaft and drive gear, with cams and a partial view of cam followers.

With reference to FIGS. 14 and 18, a cam shaft 155 is journaled between the frame plates 111, 112 by suitable bearings above and in parallel relation to the drive shaft 133. A cam drive gear 156 is mounted on the cam shaft 155 immediately inside the frame plate 112. Cam drive gear 156 is constructed and positioned for gear engagement with drive gear 141, the gear ratio between the two being such that during each load or unload cycle, the drive shaft 133 rotates four revolutions for a cam shaft rotation of 345°. A trigger member 157 is mounted on the face of cam drive gear 156 for rotation therewith by means of a nut 157a. An arcuate slot 157b permits the trigger member 157 to be adjusted relative to the drive gear 156. An axially projecting trigger 157c serves a cyclical function as will become apparent below.

A spacer 158 is mounted on the cam shaft 155 by means of a set screw, and a latch cam 159 is affixed to the end of the spacer 158 by a plurality of mounting screws.

Axially spaced from the latch cam 159 is an arm cam 160 mounted on a hub 161, which is secured to cam shaft 155 by a set screw.

Axially spaced from the arm cam 160 and hub 161 is a release cam 170, which is also secured to the cam shaft 155 by a set screw.

With reference to FIGS. 15, 16 and 18, a third shaft 162 is mounted between the frame plates 111, 112 in parallel relation to the drive shaft 133 and cam shaft 155 somewhat below and to the side of the former. An arm cam follower assembly 163 is carried by the shaft 162 for swinging movement relative thereto. Arm cam follower assembly 163 includes a generally upwardly projecting follower 163a having a roller 163b connected to its upper end for low frictional engagement with the arm cam 160. Arm cam follower assembly 163 further comprises a laterally extending lever 163c which lies just adjacent to frame plate 111. The follower arm 163a is normally biased into engagement with arm cam 160 by a coil spring 164 extending between the follower 163a and a stub shaft 165 projecting horizontally from the frame plate 111.

With continued reference to FIG. 16, a pair of lever members 166, 167 are respectively secured to the mounting blocks 126 of the lefthand and righthand transfer arm assemblies 114, extending laterally toward each other with the ends in overlying relation. Lever 167 includes a lateral slot 167a at its extreme end, and the lever 166 includes a roller stud 166a received by the slot 167a.

The extreme end of lever 163c engages the bottom of roller stud 166a. It will thus be appreciated that swinging movement of the follower arm 163a, under the influence of arm cam 160, is transferred through the lever 163c to the levers 166, 167, and from thence to the transfer arm assemblies 114, causing them to swing in and out relative to each other as indicated by the arrows in FIG. 16.

Figure 20:
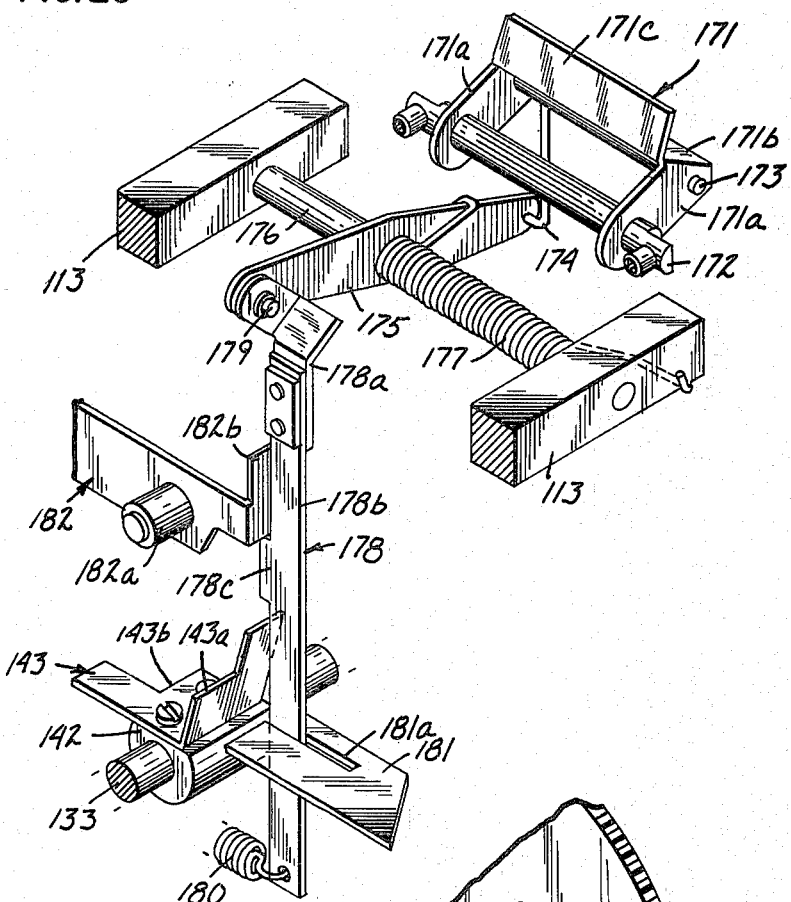
FIG. 20 is an enlarged perspective view of the cartridge gate actuating structure.

The mechanism for actuating the retaining gate 58 of a selected cartridge 11 is specifically shown in FIG. 20, and additional reference is made to FIGS. 7 and 14. A gate actuator 171 consists of a pair of opposed arms 171a that are interconnected by a cross member 171b. An edge 171c of the cross member 171b is bent laterally outward for actuating engagement with a cartridge retaining gate. The arms 171a are pivotally mounted on a horizontal pin 172 which is secured at the upper edge of frame plate 111. A pin 173 is rotatably disposed between the arms 171a parallel to the pin 172. An actuator link 174 projects downward from pin 173 into operative engagement with one end of a bell crank 175. Bell crank 175 is secured by a set screw to a transverse shaft 176 mounted between the upper cross supports 113. A torsion spring 177 encircling the shaft 176 acts between one of the cross supports 113 and the bell crank 175, normally biasing the outer end of the bell crank 175 downward, and at the same time forcing the gate actuator 171 into its lowest position.

The opposite end of bell crank 175 pivotally carries an elongated, vertically disposed latch 178 by means of a pin 179. Latch 178 consists of two longitudinal rigid metal strips 178a, 178b which are disposed in overlapping relation and bolted together to permit longitudinal adjustment. A dog 178c projects laterally from an intermediate region on the latch strip 178b. Latch 178 is normally biased in the direction in which the dog 178c projects by a coil spring 180 extending between its lower end and the arm cam follower shaft 62.

A guide plate 181 (FIGS. 15, 20) is mounted to the inner face of frame plate 112, projecting horizontally inward therefrom. Guide plate 181 includes a slot 181a which serves to guide the latch 178 in its upward and downward movement.

It will be appreciated that upward and downward movement of the latch 178, imparted by mechanisms described below, effects movement of the gate actuator 171 to open the gate 58 of a selected tape cartridge 11, thus releasing the cartridge for entry into the receiving area between transfer arm assemblies 114. Such upward and downward movement is accomplished by a follower for the latch cam 159, which is generally designated 182 and may be seen in FIGS. 15, 18, 19 and 20. Latch cam follower 182 is pivotally mounted on a fourth shaft 183, which is mounted between frame plates 111, 112 in parallel relation to shafts 133, 155 and 162 generally above the latter. Latch cam follower 182 includes an arm 182a which projects toward latch 178 and is capable of upward and downward swinging movement. The extreme end of arm 182a is bent to the side 90° and extends upwardly to form an engager 182b that cooperates with the latch dog 178c.

The latch cam follower 182 moves up and down under the influence of the latch cam 159 (FIG. 18), which engages a roller 182c projecting from the side of the follower arm 182a.

The torsion spring 177 of the bell crank 175 normally urges the latch 178 upward. However, the latch cam 159 is disposed above the roller 182c so that the engager 182b through its engagement with the latch dog 178c permits the latch 178 to move upwardly only as the latch cam 159 moves away from its maximum dwell. So long as the latch dog 178c is engaged by the engager 182b, which is assisted in this function by the coil spring 180, movement of the latch 178 and gate actuator 171 is controlled by rotation of the latch cam 159.

Once the selected cartridge has been released from its recess 43 within the carousel 32 to the transfer arm assemblies 114, and then carried to the read/write position at the tape head, it is necessary to insure that the cartridge delivers and receives proper and accurate information to and from the read/write head. This is accomplished by inposing a lateral reference force on the side of the cartridge relative to a lateral stop, and imposing a downward force on the cartridge relative to a bottom stop.

The lateral and bottom stops are best understood with initial reference to FIG. 14, in which a tape deck 191 is referred to generally by the numeral 191. Tape deck 191 is a thick, rectangular plate which is vertically disposed and mounted in spaced relation to the side plate 111. The spaced mounting is accomplished with a generally rectangular spacer block 192 one side of which is secured to the side plate 111 along its bottom outer face (see also FIG. 9). The bottom face of the tape deck 191 is bolted to the opposite side of the spacer block 192, and it projects upwardly in the aforementioned spaced relation to the side plate 111 without additional structural support. As described, the side plate 111, tape deck 191 and the transfer arm assemblies 114 together define a pocket within which a cartridge 11 may be loaded for the read/write operation.

With reference to FIGS. 14, 15 and 23, a cartridge guide, bearing the general reference numeral 193, is rigidly secured to each side of the tape deck for cooperation with one of the transfer arm assemblies 114. The function of the cartridge guides 193 is to firmly guide the cartridge 11 as it is brought to the read/write position by the transfer arm assemblies 114, and to provide the lateral and bottom stops mentioned above.

The cartridge guide 193 consists of a vertically disposed, L-shaped support defined by legs 193a, 193b. A vertical tapered finger 193c is integrally formed with the leg 193b but projecting slightly thereabove as shown in FIG. 23. As particularly shown in FIG. 26, the tapered finger 193c has a cross sectional size which closely corresponds to the size of the longitudinal recesses 20 in the sides of cartridge 11; and it is this relationship which gives rise to accurate guiding of the cartridge 11 as it is brought to the read/write position. In this regard, the tapered or beveled effect at the top of the finger 193c insures its proper entry into the associated longitudinal recess 20.

With reference to FIG. 2, the finger 193c also performs the function of engaging the rearwardly extending tab 21a of the cartridge door 21, which causes the door 21 to open as the cartridge 11 is lowered relative to the guides 193. This exposes the tape 16 to the read/write head via the access opening 18, thus permitting the interchange of information.

With specific reference to FIG. 23, the vertical finger 193c is formed with two laterally extending bosses 193d which serve as stops against which the above-mentioned lateral reference forces can be imposed. The bottom stop is provided by a plate 193e which is secured to the bottom of the legs 193a, 193b, and the vertical finger 193c.

With reference to FIGS. 14, 22 and 23, the lateral reference force imposed on the cartridge 11 in the read/write position is provided by a pair of laterally spaced bias plates 201. Each of the plates 201 generally takes the form of and operates in a like manner to a bell crank, being pivotally connected by a pin 202 to a mounting block 203, which is in turn secured to the side plate 111 (FIG. 14). Each of the bias plates 201 defines a nose 201a which, upon pivotal rotation of the plate 201, directly engages the back plate 12 of cartridge 11 and thereby imposes the lateral reference force.

Each of the plates 201 is normally biased into a cartridge engaging position by a coil spring 204 mounted between the rear corner of the plate 201 and a stud shaft 205 disposed immediately below, and which is mounted to the side plate 111.

Simultaneous movement of the bias plates 201 between cartridge engaging and nonengaging positions is effected by a bail 206, each end of which is also mounted by the pivot pins 202 to the mounting blocks 203. Each bias plate 201 includes a rearwardly extending tab 201b which is positioned for engagement by the bail 206. It will be appreciated that upward pivotal movement of the bail 206 serves to retract the bias plates 201 from their cartridge engaging positions.

With reference to FIGS. 18 and 22, the bail 206 includes a roller 206a mounted intermediate its ends and disposed for operative engagement by the release cam 170 is so constructed and disposed that the bail 206 is forced upwardly (retracting the bias plates 201) while the cartridge 11 is moving downward to the read/write position. As the cartridge reaches its bottom position (engaging the bottom reference plates 193e), the release cam 170 rotates to a position permitting the bail 206 to swing downward. This enables the coil springs 204 to pull downward on the bias plates 201, forcing the engaging noses 201a outward into biasing engagement with the cartridge 11. As pointed out above, this lateral reference force is imposed through the cartridge 11 and resisted by the lateral reference stops 193d.

The vertical reference force imposed on cartridge 11 is accomplished by the tensioner 144. With reference to FIGS. 15, 19, 24 and 25, the tensioner assembly 144 broadly comprises an input section and an output section which are relatively rotatable in a predetermined manner. The input section, which generally appears on the righthand side of FIG. 25, makes use of the drive shaft 133 for the input rotational force. A pin 211 projects radially from and perpendicular to the shaft 133. A first spool half 212 is rotatably mounted on the shaft 133 by roller bearings 213, its axial position being immediately adjacent the pin 211. A retainer ring 214 maintains the spool half 212 in this axial position.

It will be noted that the spool 212 consists of a flange 212a secured to a hub 212b by a screw 212c, which passes through an arcuate slot in flange 212a (not shown). This enables the flange 212a to be rotatably adjusted relative to the hub 212b for a reason described below.

A pin 215 is carried by the spool half 212, projecting axially beyond the radial pin 211. As described, rotation of the shaft 133 in either direction will result in engagement of the axial pin 215 by the radial pin 211, thus causing similar rotation of the spool half 212.

The output section of tensioner 144 consists of a tubular output shaft 216 which is mounted on the shaft 133 and rotatable relative thereto. One end of the tubular shaft 216 is disposed immediately adjacent the radial input pin 211, and it is held in this axial position by retainer ring 217. It will be observed in FIG. 25 that the first synchronizing gear 145 and the gear pulley 146 are both securely mounted on the tubular output shaft 216 for rotation therewith.

A flat ring 218 which defines a radial output pin 219 (FIG. 24) is staked to the end of tubular shaft 216 so that it lies adjacent the input radial pin 211.

A second spool half 211 is mounted for independent rotation on the tubular shaft 216 by roller bearings 222. A second axial pin 233 is carried by the spool half 221, projecting from the spool half 221 a sufficient distance for engagement by each of the radial pins 211, 219 (FIG. 25). The axial pin 215 projects a corresponding distance from the spool half 212, so that it may also be engaged by both of the radial pins 211, 219.

A torsion spring 224 circumferentially encloses the lesser diameter portions of spool halves 212, 221. Each end of the torsion spring 224 is secured to the associated flange portion of the spool halves 212, 221.

The flange 212a is rotationally adjusted relative to the hub 212b to set the torque of spring 224 to a specific value.

Assuming the radial and axial pins to be in the position shown in FIG. 24, counterclockwise rotation of the shaft 133 causes engagement of the radial input pin 211 with the axial output pin 223, which causes the second spool half 221 to rotate directly with the shaft 133. The first spool half 212 is connected directly to the torsion spring 224. So long as the load torque on the tensioner 144 (i.e., the movement of cartridge 11 during the load- /unload cycle) does not exceed the torque limit of the torsion spring 224, the spring directly transfers rotation of the second spool half 221 to the first spool half 212 and the axial input pin 215. Axial pin 215 in turn transfers the rotational motion by direct engagement with the radial output 219, which is rigidly secured to the output shaft 216, the first synchronizing gear 145 and the gear pulley 146. Stated otherwise, the gears 145, 146 rotate directly with the shaft 133.

However, if the load torque exceeds the limit of the torsion spring 224, the rotational motion of the second spool half 221 cannot be transmitted directly to the first spool half 212. Rather, the torsion spring 224 begins to wind up as a result of the differential motion between the spool halves, producing a torque buildup between the input section and output section of the tensioner 144.

It will be appreciated that the same torque buildup may also result from clockwise rotation of the drive shaft 133 (as viewed in FIG. 24). With clockwise rotation of the shaft 133, the radial input pin 211 engages the axial input pin 215, and rotation to the output section of tensioner 144 may be traced from the first spool section 212, torsion spring 224, second spool section 221, the axial output pin 223, radial output pin 219, output shaft 216 and gears 145, 146. If the load torque on the output section of tensioner 144 exceeds the limit of torsion spring 224, the first spool section 212 will continue to rotate relative to second spool section 221, and the differential motion causes the torque buildup of the torsion spring 224.

The apparatus is designed so that the limit of torsion spring 224 is exceeded during the load cycle when the cartridge 11 reaches its read/write position and engages the bottom stop plate 193e. During the unload cycle, the limit of torsion spring 224 is exceeded at the time the cartridge carrying pawls 124 engage the retaining clips 125 of the transfer arm assemblies 114.

The travel distance of the pawls 124 between the upper and lower stops represents approximately 2½ revolutions of the drive shaft 133. However, as indicated above, the drive shaft 133 rotates approximately four revolutions during each complete load or unload cycle. Consequently, the drive shaft 133 rotates approximately 1½ revolutions more than the synchronizing gear 145 and gear pulley 146 of the tensioner 144. The phasing of movement of the pawls 124 relative to the cam shaft 155 is such that the rotational difference in the input and output sections of tensioner 144 is evenly divided with respect to the upper and lower stops for the pawls 124. Stated otherwise, when the pawls 124 reach either the upper or lower pawl stops, the drive shaft 133 continues to rotate for approximately ¾ of one revolution, which in turn causes the torque buildup within the tensioner assembly 144.

During the load cycle, the torque buildup begins at the point that the cartridge 11 reaches the read/write position and engages the bottom reference plate 193e. It is this torque buildup, which is carried through the output section of the tensioner 144 to the pawls 124, which creates a downward biasing force on the cartridge 11. The combination of this downward reference force with the lateral reference force exerted by the bias plates 201, as described above, insures precise registration of the cartridge 11 in its read/write position (FIG. 23).

During the torque buildup of tensioner 144, the continued ¾ turn revolution of shaft 133 also causes continued rotation of the cam shaft 155 and its components. The phasing is such that at the beginning of torque buildup, the arm cam 160, acting through the arm cam follower 163, causes the transfer arm assemblies 114 to swing outwardly.

Figure 21:
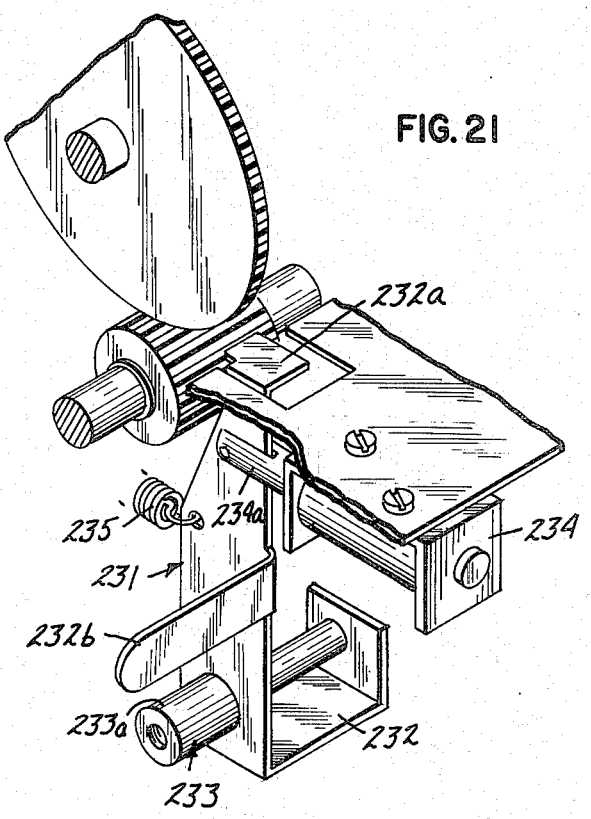
FIG. 21 is an enlarged perspective view of the brake assembly for the station mechanism.
Figure 27:
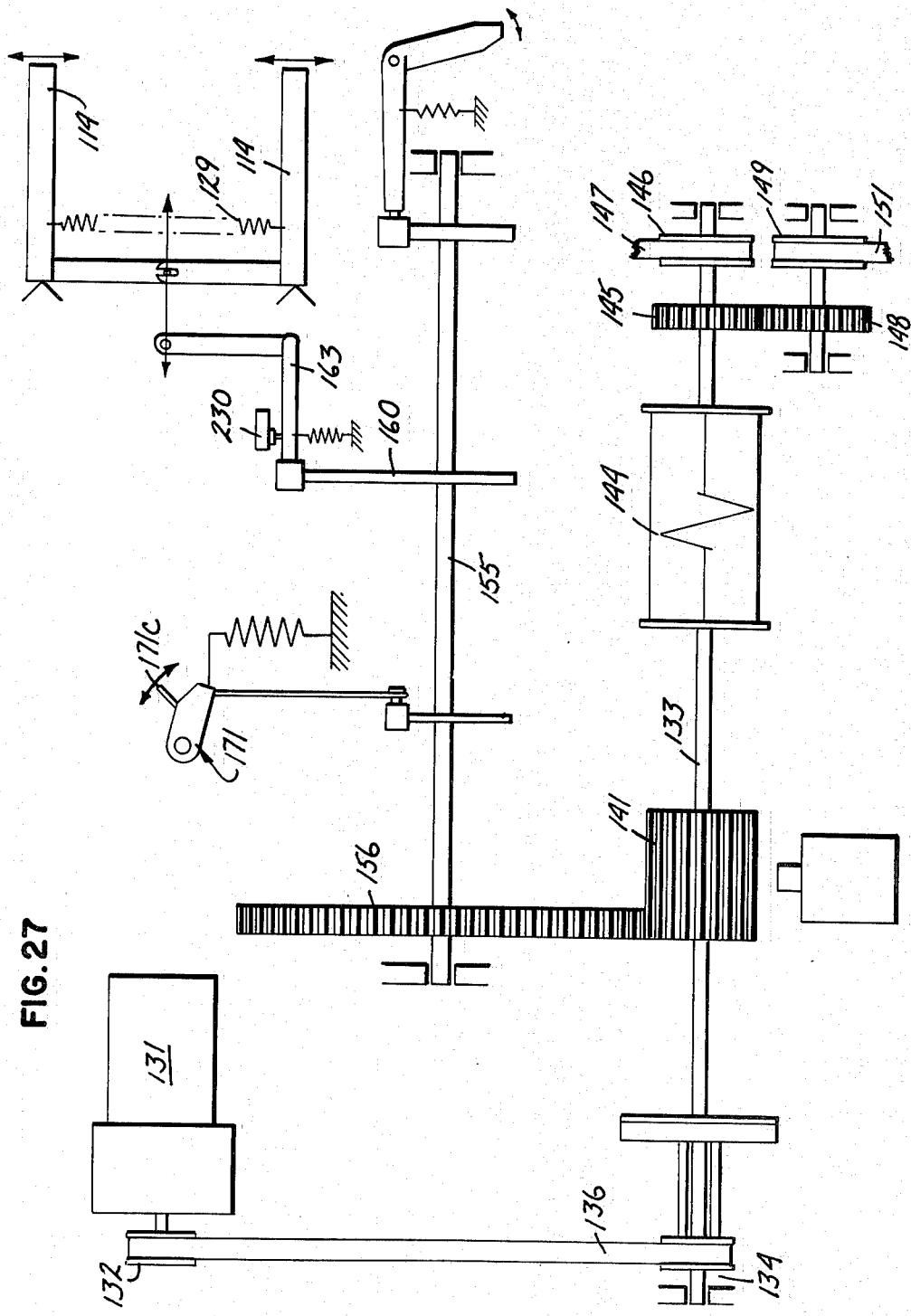
FIG. 27 is a schematic representation of the various components of the station mechanism.

As the arm cam follower 163 is moved to its furthest position from cam shaft 155, it engages a microswitch 230 (FIGS. 15 and 27), which controls the supply of electricity to motor 131. Actuation of the switch 230 marks the end of the load cycle and prevents the motor 131 from continuously running against overload. However, at the time that motor 131 is shut off, the torque buildup of tension assembly 144 tends to urge the drive shaft 133 in the opposite direction, which is undesired at this point. Reverse turning is avoided by a brake assembly 231, which is shown in detail in FIG. 21.

Brake assembly 231 consists of a brake arm 232 which is rotatably mounted on a shaft 233. Shaft 233 is secured to and projects horizontally inward from the bottom of side plate 112. Brake arm 232 is held in a predetermined spaced relation to the side plate 112 by a spacer 233a which forms part of the shaft 233. Spacer 233a is formed with an axial threaded opening, which permits mounting of the assembly 231 to the side plate 112 by a mounting screw (not shown).

Brake arm 232 projects upwardly from the shaft 233, and its extreme upper end is bent 90° to define an engaging foot 232a disposed in proximity to the drive gear 141. A rectangular recess is formed in the edge of guide plate 181 to accommodate the engaging foot 232a.

Because of its construction, the engaging foot 232a is capable of moving into and out of brake engagement with the drive gear 141 by swinging movement of the arm 232. This movement is effected by a solenoid 234 which is mounted to the bottom of guide plate 181, and which includes a plunger 234a pivotally connected to the brake arm 232. Energization of the solenoid 234 retracts the plunger 234a to disengage the foot 232a from the drive gear 141.

Brake arm 232 is biased by a coil spring 235 so that the foot 232a normally engages the drive gear 141, preventing rotation of the shaft 133. The opposite end of spring 235 is connected to the shaft 162.

Brake arm 232 further comprises a laterally extending tab 232b which projects through an access opening in the side plate 112 (FIGS. 14, 15) permitting manual override of the brake assembly 231.

Actuation of the microswitch 230 by the arm cam follower 163 simultaneously turns the motor 131 off and deenergizes solenoid 234, thus permitting brake arm 232 to immediately engage drive gear 141 and preventing further rotation of either the drive shaft 133 or the cam shaft 155. This status is maintained until an unload cycle is initiated.

Similarly, the brake assembly 231 is utilized at the end of the unload cycle, at which time the transfer arm assemblies 114 swing outwardly to release the cartridge 11 under the influence of arm cam 160. In this outward position, transfer arm assemblies 114 do not interfere with revolving movement of the carousel 32 (FIG. 9). The arm cam follower 163 again engages microswitch 230 at this time, thus cutting electrical power to the motor 131 and de-energizing the brake solenoid 234. This status is also maintained until a new load cycle is initiated.

Station mechanism 76 includes additional components which cooperate with the interposer hub 142 and interposer 143 to perform the cartridge aborting process mentioned above, where the cartridge is not properly received within the station mechanism 76 during the load cycle.

With reference to FIGS. 19, 20 and 28, it will initially be noted that the interposer hub 142 is freely rotatable on the drive shaft 133, but is biased in the clockwise direction (FIG. 28) by a spring 142a one end of which is connected to a screw 142b on the hub 142. The other end looks onto the guide bracket 181 (FIGS. 15, 20).

Interposer 143 is L-shaped as pointed out above, with one leg secured to a flattened section of the hub 142 by a pair of screws. Each of the legs of interposer 143 is formed with a stepped recess, as shown at 143a, 143b.

With reference to FIGS. 15 and 19, the additional components used for the aborting process include a control arm 241 and a keeper 251. Control arm 241 is immovably secured to one end of a shaft 242 that is mounted to and projects transversely from a lever arm 166 (see also FIG. 16). It will be recalled that the lever arm 166 is one of several components which effects the inward and outward swinging movement of the transfer arm assemblies 114. As such, the movement of lever arm 166, and accordingly the shaft 242, directly represent movement of the transfer arm assemblies 114. The arcuate arrows of FIG. 28 indicate the direction of lateral movement of the shaft 242, which of course dictates movement of the control arm 241.

The outer end of control arm 241 forms a nose which is obtusely angled relative to the primary extension of the arm. A perpendicular control surface 241a is formed at the end of the nose and disposed for engagement with the stepped recess 143b of interposer 143. The nose also includes a beveled surface 241b.

Keeper 251 comprises a U-shaped arm which is freely mounted on a stub shaft 252 projecting inwardly from side panel 112. One leg of the keeper 251, which bears the reference numeral 251a, projects outwardly for engagement with the longest leg of interposer 143 under circumstances described below. The extreme end of the leg 251a is formed with a stepped recess which serves to lock the interposer 143 into a predetermined position.

The other leg of the U-shaped keeper, which bears the reference numeral 251b, projects in the same direction, and includes a lateral tab 251c that is disposed for engagement by the trigger 157c of the cam drive gear 156 (FIG. 18).

With reference to FIG. 28, keeper 251 is normally biased so that the leg 251a engages interposer 143 by a spring 253, the remote end of which is connected to the shaft 162.

Reference is made to the sequential operation (FIGS. 28–31), which show the interrelationship of the aborting process components when the cartridge 11 has been properly received by the station mechanism 76. In these figures, the position of the pawls 124 (as determined by the position of transfer arm assemblies 114) is shown relative to the rectangular notch 12a of cartridge 11. Also included in each of these figures are the relative positions of the cartridge retaining gate 58 and the gate actuator 171.

It will be understood that the relative positions of each of the three component groups of FIGS. 28–31 are shown at the same instant of time. Thus, FIG. 28 represents the start of a cartridge load cycle with the cam shaft 155 at the "home" or zero degree position. At this point, the transfer arm assemblies 114 are in their "out" position, and the pawl 124 is retracted from the cartridge 11. Cartridge 11 is retained in its appropriate carousel recess by the retaining gate 58, and the gate actuator 171 is at its rest position.

Similarly, the latch 178, which controls the position of the gate actuator 171, is at its rest position, as is the latch cam follower 182. The interposer hub 142 is maintained in the rotational position shown by reason of engagement of the stepped recess 143b of interposer 143 with the control surface 241a of control arm 241. It will be recalled that the position of control arm 241 is directly related to the position of the control arm assemblies 114 (and hence the pawls 124).

In FIG. 29, pawl 124 begins to make contact with the edge of cartridge 11, but has not yet entered the notch 12a. Latch cam follower 182 has at this point rotated downward so that its engager 182b engages the latch dog 178c, thus moving the latch 178 downward.

Interposer hub 142 is not rotated. However, the control arm 241 has swung arcuately downward in following the transfer arm assemblies 114, so that the corner edge between the surfaces 241a, 241b is in direct engagement with the edge of the stepped recess 143b.

Gate actuator 171 has begun to swing upwardly toward engagement with gate 58.

In FIG. 30, the pawl 124 has entered the notch 12a of cartridge 11. This is a critical movement in the determination whether the cartridge 11 is in a proper position within the station mechanism 76 to permit its release from the carousel. This critical movement is sensed by the control arm 241, which continues to follow swinging of the transfer arm assemblies 114 to their "in" position. This in turn causes the corner edge between control surfaces 241a, 241b to fall below the edge of stepped recess 143b. This enables the interposer hub 142 to rotate in a clockwise direction until the interposer 143 comes to rest in engagement with the beveled surface 241b. The opposite leg of the interposer 143 having been retracted from the line of movement of the latch dog 178c, downward movement of the latch 178 under the influence of the latch cam follower 182 is permitted.

It will be recalled that the gate actuator 171 is connected through linkage to the latch 178, and it thus approaches the gate 58 as shown.

FIG. 31 shows the latch cam follower 182 and the latch 178 at the end of their down stroke, at which point the gate actuator 171 has engaged the gate 58, swinging it laterally to release cartridge 11.

At this point, the pawl 124 continues its downward movement as heretofore described, pulling the cartridge 11 downwardly toward the read/write position.

FIGS. 32–37 show the relative positions of the same components during the cartridge aborting process. In these figures, it will be noted that the cartridge 11 is shown in a reversed position, which obviously precludes entry of the pawl 124 into the nonexistent notch 12a.

Figure 32:
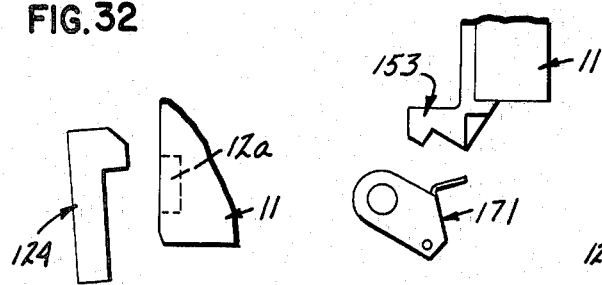
Figure 33:
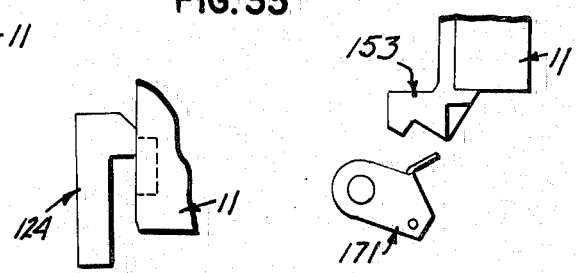

FIG. 32 is much the same as FIG. 28, showing relative component positions at the beginning of the load cycle. FIG. 33 is similar to FIG. 29, with the pawl 124 beginning to approach where the notch 12a should be. Control arm 241 is again positioned at the critical point where it will determine whether the cartridge can be released from the carousel, in which case it falls under the interposer 143; or whether the process should be aborted.

Figure 34:
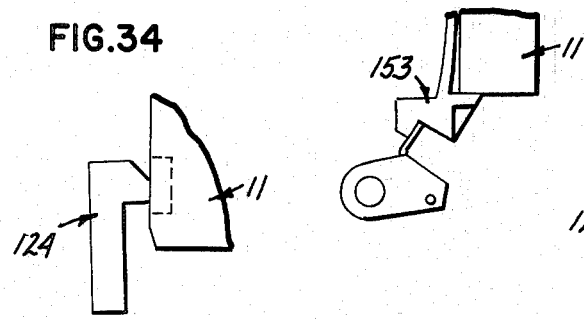

As shown in FIG. 34, pawl 124 cannot enter the notch 12a, and the transfer arm assemblies 114 have reached their inwardmost position. This is reflected by the position of control arm 241, which has not varied its position from that shown in FIG. 33. Accordingly, control arm 241 maintains the interposer 143 in a position of direct line engagement with the latch dog 178c.

Figure 35:
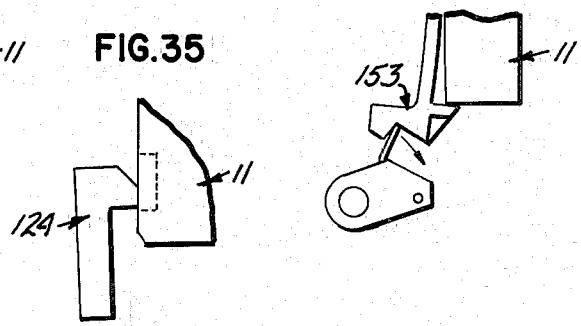

During this process, the latch cam follower 182 has continued its downward movement, carrying with it the latch 178 until engagement by the interposer 143 occurs. As shown in FIG. 35, the continued downward movement of the latch 178 causes the latch dog 178c to directly engage the interposer 143, effecting a lateral deflection of both components to the extent that the latch 178 moves out of the driving engagement of latch cam follower 182. Deflection of the interposer 143 takes the form of counterclockwise rotation of the interposer hub 142, to the extent that the opposite extreme end of interposer 143 slides up and enters the stepped recess at the end of keeper leg 251a. This of course precludes return of the interposer 143 to its nonobstructing position, even under the influence of the coil spring 142a.

Although the gate actuator 171 has approached the gate 58 and effected minimal lateral deflection, it will be appreciated that further release is prevented since the latch 178 can no longer move downward.

Figure 36:
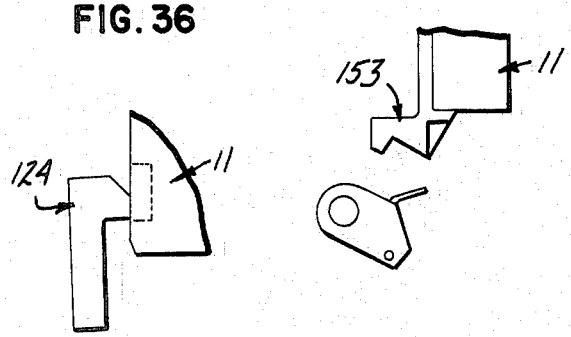
FIGS. 32-37 are a sequential representation of the relationship of FIGS. 28-31, but with the cartridge improperly oriented relative to the station mechanism.

In FIG. 36, latch 178 has been deflected laterally a sufficient amount to fully avoid the engagement of latch dog 178c by the latch cam engager 182b. It will be recalled that the torsion spring 177 operates against the bell crank 175 to normally urge the latch 178 vertically upward. Accordingly, when the latch dog 178c moves out of engagement with the latch cam engager 182b, latch 178 moves upward past the engager 182b. In FIG. 36, the latch cam follower 182 is shown at the end of its down stroke, and latch 178 has moved upward to its normal at rest position as dictated by torsion spring 177.

At the same time, and also as shown in FIG. 36, gate actuator 171 is retracted to its normal at rest position, also under the influence of torsion spring 177. This of course precludes release of the cartridge 11 from its carousel recess, since the corresponding gate 58 has not been deflected sufficiently.

Figure 37:
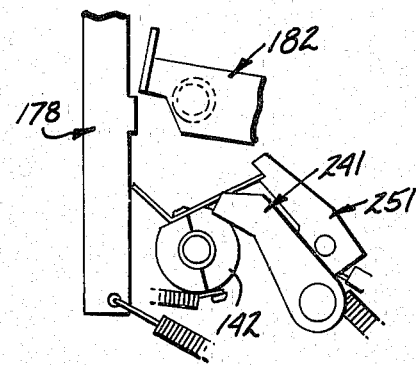

The position of the keeper arm 251a in FIGS. 35-37 acts as a memory to "store" the fact that there has been no cartridge release by the gate actuator 171 during the load cycle. With the interposer 143 maintained in this position by the keeper arm 251a, there can be no actuation of the gate 58 during the following unload cycle. As long as the interposer 143 maintains this position, there can be no engagement by the latch cam follower 182 with the latch 178, as shown in FIG. 37.

As the pawls 124 move up during the aborted unload cycle, they engage the lower edge of the cartridge 11 and attempt to raise the cartridge in its carousel recess. Since the cartridge 11 is retained in its recess by the retaining ring 51, the force exerted by the pawls 124 is resisted. As this force builds up, it creates a component force in the out position of the transfer arm assemblies 114 due to the chamfer on top of the pawls 124. This causes the pawls 124 to deflect around the lower edge of the cartridge and to reach the upper pawl stop (retaining clips 125), followed by swinging movement of the transfer arm assemblies 114 to their outermost position.

At the end of the abort cycle, the trigger member 157 on the cam drive 156 engages the tab 251c of keeper arm 251b. This causes a clockwise movement of the keeper arm 251a (as viewed in FIGS. 28-37), which releases the interposer 143 from the abort position. As a result, the coil spring 142a rotates the interposer hub 142 in a clockwise direction. At the end of the unload cycle, the control arm 241 has returned to the position shown in FIG. 28, and the mechanism is then ready for the next load cycle.

With reference to FIG. 14, a recording head 261 is carried by a bracket 262 in a position so that the portion of tape 16 passing through the external access opening 18 will engage the recording head 261 when the cartridge is in the load position. This relationship is best shown in FIG. 9, in which the mounting bracket 262 and tape deck 191 are not shown for purposes of clarity.

As shown in FIG. 14, mounting bracket 262 is L-shaped, the vertical leg of which is mounted to the outer face of tape deck 191 by a plurality of screws 263. Recording head 261 is mounted to the horizontal leg of bracket 262 in the aforesaid position. Head 261 is of the dual gap type, and is capable of reading and writing on up to four channels of the tape 16.

With continued reference to FIG. 14, a twelve volt DC reversible motor 264 is carried by the tape deck 191 for reversibly driving the tape 16 of a selected cartridge 11. Motor 264 has a drive shaft 265 projecting horizontally from each end. One end of the drive shaft 265 projects into the cartridge load area and carries a resilient drive wheel 266 which is sized and positioned for driving engagement with the belt capstan 24 when the cartridge 11 is in the load position.

The opposite end of drive shaft 265 carries a timing disc 267 which rotates relative to a motor speed sensor 268 consisting of a photosensor disposed in alignment with light emitting diode. The speed sensor 268 is carried by an L-shaped bracket 269 mounted directly to the end of motor 264. The speed sensor 268 measures the rotational velocity of the timing disc 267, and this information is transmitted to the microprocessors, which make any necessary corrections to the speed of motor 264, thus insuring that it operates at a virtual constant speed.

Figure 14A:
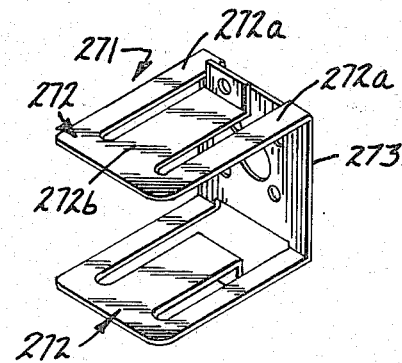
FIG. 14A is a perspective view of a parallelogram spring used to mount a capstan drive motor.

Motor 264 is resiliently mounted on the tape deck 191 in a manner which permits the belt capstan 24 to engage the resilient drive wheel 266 under the influence of a biasing force. With reference to FIGS. 14 and 14A, this is accomplished by a motor mounted on a parallelogram spring represented generally by the numeral 271. Parallelogram spring 271 is generally U-shaped, including symmetrical, horizontally disposed spring leaves 272 (only the upper of which is visible in FIG. 14) interconnected by a vertical member 273. The end of motor 64 is secured to the member 273 by a plurality of screws (FIG. 14 only).

Each of the spring leaves 272 includes outer planar legs 272a which are commonly connected at one end to a central planar leg 272b. The outer legs 272a are connected directly to the vertical member 273. Each of the central legs 272b is mounted directly to the tape deck 191 by a mounting screw 274.

As described, it will be appreciated that the outer legs 272a of both spring leaves 272 and the vertical member 273 are together vertically movable to a limited degree in spring fashion relative to the fixed central legs 272b. The construction is such that the four outer legs 272a together move as a parallelogram, thus insuring that the drive shaft 265 of motor 264 is always perpendicular to the cartridge 11 and providing for proper driving engagement between the drive wheel 266 and the belt capstan 24. Because of the spring relation between the sides 272a and the associated central leg 274b, the entire motor 264 and its assembly resiliently yield as the capstan 24 engages the drive wheel 266. The resulting biasing force also insures proper driving force between the two.

With reference to FIGS. 9 and 14, a printed circuit board 275 is horizontally mounted to the spacer block 192 by a plurality of spacers 276, so that its upper surface is at a predetermined level relative to the cartridge load position. In addition to its usual electrical connecting functions, printed circuit board 275 also serves to support a mounting block 277 and a pair of microswitches 278, 279.

As best shown in FIG. 9, the vertical leg of mounting block 277 carries a light emitting diode 277a which projects light horizontally at a level causing it to strike the angular reflective mirror through the window 27 of cartridge 11. The mirror is disposed above the cartridge tape and is positioned so that light is reflected downward onto the tape. The tape is provided with openings or transparent portions at the beginning and end which serve as beginning-of-tape and end-of-tape markers. These openings or transparent portions permit the reflected light to pass through the tape momentarily, where it is sensed by one of two photosensors 277b, 277c, which are carried by the horizontal leg of mounting block 177 (FIG. 14).

Microswitches 278, 279 are also disposed immediately below and in line with cartridge 11. Microswitch 278 is specifically positioned relative to the rotatable plug 28 of cartridge 11, and thus serves as a write-inhibiting switch when the plug 28 is rotated to the read-only position. Microswitch 279 is a cartridge-presence switch, and is disposed to be engaged by the cartridge 11 when it reaches the read/write position.

The signals generated by photosensors 277b, 277c and microswitches 278, 279 are transmitted to the microprocessors through means not shown.

Reference is made to FIG. 38, which is a block schematic diagram depicting the functional relationship of the controlling and controlled components of the overall apparatus. The diagram of FIG. 38 discloses four read/write stations 76, although it will be appreciated that the apparatus 31 is entirely capable of operating with but a single read/write station 76, albeit with less versatility.

The controlling components preferably include two microprocessors 301 when apparatus 31 includes four read/write stations 76. The microprocessors 301 are synchronously controlled by, timing circuits 302. Buss controls 303 are interposed between each of the microprocessors 301 and a master buss connector 304. The buss 304 establishes proper connection between the microprocessors 301 and the other control components. These include a read/write station select function component 305, first and second read/write and control function components 306, first and second input/output ports for interfacing with computer equipment, a port select function component 308, a carousel control function component 309, an operator panel 310 (which bears the reference numeral 34 in FIG. 3), an address switch 311, an address decoder 312, a random access memory 313 and a readout memory 314, as well as the read/write stations 76.

The readout memory 314 may include a program which, in connection with the microprocessors 301, serves to control the apparatus in a desired manner. As such, the carousel apparatus 31 may simultaneously interface two external computers with the cartridge data base, with the cartridge 11 selectively indexed, loaded, processed and unloaded automatically. The port select function component 308 selectively establishes communication between any read/write station 76 and either of the ports 307.

The specific operation of carousel apparatus 31 begins with insertion of a plurality of cartridges 11 into the respective recesses 43 of the carousel 32. This is accomplished by rotating the retaining ring 51 so that the retainers 51a do not block the recesses 43. Once the cartridges 11 are inserted into the recesses 43, the retaining ring 51 is released, and the biasing springs 52 return the ring to a point where the retainers 51a overlie the recesses 43 and prevent removal of the cartridges 11.

The cartridges 11 are retained in the position shown in FIG. 3 by the gate 58, the retainer 58a of which normally underlies the associated cartridge 11.

The carousel 32 may now be placed over the center post assembly (FIG. 9), where it will be locked in place by the latch pawl 87 (FIG. 12). The carousel 32 is randomly placed on the center post assembly 72 without regard to the position of cartridges 11 relative to station mechanisms 76.

When the unit is switched on and readied for operation from the control panel 34, power is applied to the drive motor 73 in the form of stepped pulses at a predetermined frequency. This causes the drive motor 73 to operate at a first or high speed, causing the carousel 32 to revolve toward a "home" position. This position is determined by the sensor 92 (FIG. 9), which "reads" the character of the slots 65a, 65b of the positioning ring 61 (FIG. 8). As pointed out above, the larger slots 65b are oriented relative to the stud 66, which is in turn oriented relative to the cartridge recess 43 bearing the numeral 1. Accordingly, when the slots 65b pass the sensor 92, this information passes to the microprocessors 301, and the speed of drive motor 73 is immediately reduced to a second or slow speed by pulses at a lesser frequency.

At the same time, the solenoid 102 of indexing mechanism 75 is actuated, which causes the indexing wheel 105 to extend into engagement with peripheral flange 46 (FIG. 4). As the carousel 32 continues to revolve at the second or lower speed, the indexing wheel 105 falls into the next arcuate notch 46b, at which time opposite end of the bell crank 103 engages the microswitch 106. As pointed out above, the signal generated by actuation of the microswitch 106 is utilized by microprocessors 301 to stop the drive motor 73, which places the carousel in a home or reference position.

The controlling components of the apparatus 31 now have a reference position from which further movements of the carousel 32 may be made. This is accomplished by the signals generated by the sensor 92 as the slot 62a passes by, which signals are transmitted to the microprocessors 301. Thus, when the apparatus receives a command to index a specific cartridge 11 relative to a particular station mechanism 76, the controlling components "know" where the selected cartridge 11 is by reason of the unique position of each of the recesses 43 relative to the "home" position, and the controlling components also "know" the intended position of the selected cartridge 11. The drive motor 73 can then be powered at its high speed, and the sensor 92 "counts" the passing of the required number of slots 62a. After the proper number have been "counted" the indexing solenoid 102 is actuated, the speed of drive motor 73 is reduced, and the carousel 32 is stopped with the selected cartridge 11 in the indexed position relative to the proper station mechanism 76. Carousel control is also such that any of the cartridges 11, which are uniquely positioned relative to the "home" position or a derivative reference position, may be moved to the next closest available station mechanism 76 or to a particular station mechanism 76 of the operator's choosing. Under either circumstance, the control circuitry determines and takes the shortest possible route for the selected cartridge 11 to its destination. The carousel control also operates in conjunction with the random access memory 313 to remember where a selected cartridge has been loaded, and to reindex the carousel 32 with the proper slot 43 adjacent the loaded station mechanism at a subsequent time, and even after a number of intervening operations. Because the read/write stations 76 are independently operable, the apparatus 31 is capable of loading selected cartridges in and simultaneously operating all four of the read/write stations. Accordingly, after one of the read/write stations 76 has been loaded, the carousel 32 can be controlled to index other cartridges 11 relative to other read/write stations 76, while remembering the position of each cartridge 11 and retaining the capability to retrieve it at a subsequent time. The control components also are capable of a prioritizing function so that one operation may take precedence over another depending on its relative importance.

With the selected cartridge 11 properly indexed relative to the desired station mechanism 76, a load command signal is automatically given. Reference is made to the schematic representation of FIG. 27 for an overall view of operations of the station mechanism 76.

With the load command, electrical power is applied to both the drive motor 31 and the solenoid 234 of brake assembly 231. As pointed out above, energization of solenoid 234 causes its plunger 234a to retract and release engagement of the foot 232a with drive gear 141. It will be recalled that at each end of the load and unload cycles, the tensioner 144 is operated to produce a torque buildup at the same time that the transfer arm assemblies 114 have swung outwardly. The torque buildup is maintained at that point by the foot 232a, which is normally biased into engagement with the drive gear 141 by the coil spring 235. Accordingly, when solenoid 234 is energized, brake foot 232a releases the drive gear 141. Simultaneously, motor 131 is powered to rotate the drive shaft 133. This rotation is transferred through the cam drive gear 156 to cam shaft 155 and arm cam 160 (FIG. 18). Arm cam follower 163 has been at the highest dwell on arm cam 160 at this point, and the rotation of shaft 155 causes it to move inward, thus permitting the spring 129 to urge the transfer arm assemblies 114 toward the cartridge engaging position (FIG. 15). Assuming that the cartridge 11 has been indexed properly relative to the station mechanism 76, the transfer arm assemblies 114 reach the cartridge engaging position with the pawls 124 (FIG. 17) positioned relative to the cartridge notches 12a.

Due to manufacturing tolerances, the elevated position of the cartridge 11 relative to the upper position of the pawls 124 may vary. To insure that the pawls 124 will engage notches 12a of the cartridge 11, contact of the pawls 124 actually occurs slightly above the notches 12a (see FIG. 29).

The drive motor 131 is operating at this time, rotating the drive shaft 133. As shown in FIG. 19, this causes simultaneous rotation of the synchronizing gears 145, 148 to move timing belts 147, 151. This in turn rotates each of the gear pulleys 128 of the transfer arm assemblies 114 (FIG. 15), which rotates the shafts 127, drive gear wheels 123 and pawl belts 121 (FIG. 17) to synchronously move the pawls 124 downward.

As the pawls 124 begin to move down, they slide along the edge of the cartridge 11 until they drop into the respective notches 12a under the force of the biasing spring 129 of the transfer arm assemblies 114. The position of pawls 124 relative to the notches 12a at this time is shown in FIG. 30.

It will be observed that the top corner of each of the pawls 124 is formed with a chamfer. The chamfer allows the pawls 124 to begin to move into the notch 12a at an early stage, and to continue such movement at a controlled velocity. The same principle applies in reverse fashion during retraction of the pawls 124 from the notches 12a during the unload cycle. The chamfer also serves to cause deflection of the transfer arms during the abort function when the cartridge 11 is misaligned.

At approximately the same time the pawls 124 initially contact the edge of the cartridge 11, gate actuator 171 begins its movement relative to the gate 58, which is holding the selected cartridge 11 within the carousel 32. As explained above, such movement of the gate actuator 171 is brought above by rotation of the cam shaft 155 and latch cam 159. At this point, and as shown in FIG. 18, the roller 182c of latch cam follower 182 engages latch cam 159 at its lowest dwell. Consequently, rotation of latch cam 159 urges the follower 182 downward.

With reference to FIG. 20, and continuing the assumption that the cartridge 11 is properly oriented so that the aborting function is not initiated, the latch cam engager 182b engages the dog 178c of latch 178, urging the latter downward. This in turn causes rotation of the bell crank 175 against the bias of torsion spring 177, pushing actuator link 174 upward. As shown in FIG. 7, this results in rotation of the gate actuator 171 about the pin 172, so that the edge 171c engages actuator member 58b to deflect gate 58 laterally to a cartridge release position. This sequential operation is shown in FIGS. 28-31.

Once the pawls 124 are fully seated in the notches 12a and the gate 58 deflected to a cartridge release position, the inner guiding surface of transfer arm assemblies 114 embrace the cartridge edges to guide it as it is pulled down toward the read/write position. With reference to FIGS. 1, 2 and 26, the cartridge 11 slides downward into engagement with the cartridge guides 193 on each of the transfer arm assemblies 114. At this time, the tab 21a of the cartridge door 21 engages the guide finger 193c, which causes the door 21 to open (FIG. 1) and exposes the tape 16 to the read/write head 261 (see also FIG. 9).

As the cartridge 11 reaches the bottom stop plate 193e (FIG. 23), the limit of torsion spring 224 is exceeded and tensioner 144 begins to wind up by reason of the continued rotation of drive shaft 133 for approximately ¾ of one revolution. As described above, this imposes a vertical reference force on the cartridge 11 which insures proper registration relative to the read/write head 261. It will also be recalled that the lateral reference force is imposed at this time by rotation of the release cam 170 to its load dwell. This enables the bail 206 to swing downward, releasing the laterally spaced bias plates 201 for lateral engagement with the cartridge 11.

At the same time that these vertical and lateral reference forces are being imposed, the continued travel of drive shaft 133 for ¾ of one revolution also rotates the cam shaft 155 and arm cam 160, which moves to its highest dwell relative to the follower 163. This has the effect of moving the transfer arm assemblies to their outer position, which, as shown in FIG. 9, is necessary to permit further rotation of the carousel 32 in indexing additional cartridges 11 to the outer station mechanisms 76.

The pawls 124 swing outwardly with the transfer arm assemblies. However, the angular movement of the transfer arm assemblies 114 is relatively small (on the order of 5°), and the arc subtended by the pawls 124 while in their lowest position on the transfer arm assemblies 114 is therefore minimal. Consequently, the pawls 124 do not leave the notches 12a, and they continue to bias the cartridge 11 downward. Coupled with the lateral reference force imposed by the bias plates 201, the cartridge 11 remains rigidly fixed relative to the read/write head 261.

At the end of the load cycle, the arm cam follower 163 engages microswitch 230 (FIGS. 15 and 27), which interrupts the supply of electricity to motor 131. Simultaneously, the solenoid 234 of brake assembly 231 is de-energized, causing the brake foot 232a to engage drive gear 141. This prevents further rotation of either the drive shaft 133 or the cam shaft 155, so that all movements are terminated during the information interchange between tape 16 and read/write head 261.

Also as described above, the arrival of cartridge 11 in the read/write position causes the cartridge presence microswitch 279 to be engaged. If microswitch 279 is not engaged, as would be the case during the abort function, the drive motor 264 for drive wheel 266 will not be actuated.

Microswitch 278 senses the position of rotatable plug 28, and it accordingly permits or prevents information to be recorded on tape 16.

Assuming the arrival of cartridge 11 into the read/write position, microswitch 279 is actuated and drive motor 264 immediately begins to run. This turns the capstan 24 of cartridge 11 at the proper speed, thus effecting information interchange between the read/write head 261 and tape 16. This information is transferred through either of the ports 307 to the computer with which the apparatus 31 is interfaced.

The controlling components shown in FIG. 38 cooperate with the selected cartridge 11 to perform a number of functions, including writing, erasing, reading both forward and backward, skipping a data block in both forward and reverse directions, skipping an entire data file in both forward and reverse directions and rewinding.

After the information interchange has been completed, the carousel 32 is reindexed relative to the station mechanism 76, and the unload cycle, which simply is a reversal of the load cycle, as initiated.

Operation of the station mechanism when a cartridge 11 is not properly oriented has been previously discussed in connection with FIGS. 32-37. However, it should be further noted that during an abort cycle, the station mechanism 76 goes through a complete load cycle even though the gate actuator 171 has not been permitted to move. Thus, the pawls 124 begin to travel downward, and although they initially engage the sides of cartridge 11, they eventually drop below the cartridge for failure to engage the notches 12a. At this time, the transfer arm assemblies 114 are able to swing inward under the influence of spring 129.

As shown in FIG. 36, control arm 241 swings in with the transfer arm assemblies 114 as if there were a cartridge 11 in the read-write station. This would allos operation of the gate actuator 171 were it not for the latching operation of the interposer 143 during the aborted load cycle. Thus, the interposer 143 serves to do what the control arm 241 is now unable to do.

Further, the fact that no cartridge 11 has reached the read/write station during the aborted load is sensed by closure of the arm switch 230 and the unchanged state of the cartridge presence switch 279. These signals combine to tell the system to initiate an immediate unload cycle.

What is claimed is:

1. Apparatus for storing and transferring electromagnetic information, comprising:
   (a) carousel means for storing a plurality of electromagnetic tape cartridges in substantially vertical positions within an array of radial slots, the carousel means including a retaining gate for each slot that projects downwardly therefrom in cantilever fashion, each gate being laterally deflectable, each gate retaining the associated cartridge when in a nondeflected position and to release the associated cartridge when deflected;
   (b) a control housing for rotatably carrying the carousel means, the control housing comprising
      (i) at least one read/write station which has a read/write position;
      (ii) indexing means for controllably rotating the carousel means to position a selected cartridge relative to the read/write station;
      (iii) actuating means associated with the read/write station for laterally deflecting the retaining gate of a cartridge which has been selectively positioned with respect thereto to release the cartridge from its slot;
      (iv) and transfer means associated with the read/write station and operable through cartridge load and unload cycles to retainably engage and move the released cartridge to the read/write position and permit the exchange of electromagnetic information, and to return the cartridge to its slot.

2. The apparatus defined by claim 1, which further comprises means for sensing improper orientation of the selected cartridge in the carousel means, and for precluding operation of the actuator means if cartridge orientation is improper.

3. The apparatus defined by claim 1, wherein the actuating means comprises:
   (a) a gate actuating member pivotally mounted for movement between gate engaging and gate nonengaging positions;
   (b) and operator means including cam means for moving the gate actuating member between said gate engaging and gate nonengaging positions.

4. The apparatus defined by claim 3, and further comprising spring means for normally urging the gate actuating member to the gate nonengaging position.

5. The apparatus defined by claim 4, wherein the operator means comprises:
   (a) first linkage means operatively connected to the gate actuating member;
   (b) and second linkage means engageable by the cam means and movable thereby, the second linkage means disposed for operative engagement with the first linkage means to impart its movement thereto.

6. The apparatus defined by claim 5, which further comprises aborting means for sensing whether the transfer means has retainably engaged the selected cartridge, and for disengaging the first and second linkage means if a selected cartridge has not been properly retainably engaged by the transfer means, thereby precluding release of the selected cartridge from the carousel means.

7. The apparatus defined by claim 6, wherein the aborting means comprises
(a) interposer means movable between a first position in which it engages the second linkage means and causes the second linkage means to move out of operative engagement with the first linkage means, and a second position remote from the second linkage means;
(b) control arm means movable as a function of transfer means operation between a first position in which it holds the interposer means in its first position when the transfer means has not properly retainably engaged the selected cartridge, and a second position in which it permits the interposer means to move to its second position when the transfer means properly retainably engages the selected cartridge.

8. The apparatus defined by claim 7, wherein:
(a) the transfer means comprises
  (i) a pair of transfer arm assemblies disposed on opposite sides of the selected cartridge and movable between a first position remote from the selected cartridge and a second position engaging the cartridge on each side thereof;
  (ii) actuating means for moving the transfer arm assemblies between said first and second positions;
  (iii) and pawl means associated with each transfer arm assembly for moving the selected cartridge between its release position and a read/write position relative to the read/write head;
(b) and the control arm means moves directly with one of the transfer arm assemblies, the first position of the control arm means corresponding with the first position of the transfer arm assemblies.

9. The apparatus defined by claim 7, which further comprises:
(a) keeper means for retaining the interposer means in its second position through all subsequent operations of the load and unload cycles;
(b) and trigger means for releasing the keeper means at the end of the unload cycle.

10. The apparatus defined by claim 7, wherein:
(a) the second linkage means comprises
  (i) a laterally extending dog member one side of which is engaged by the first linkage means to move the second linkage means in a first direction;
  (ii) and means for normally biasing the second linkage means into engagement with the first linkage means;
(b) and the interposer means is engageable with the other side of said dog member in general opposition to the first linkage means and is constructed and arranged to deflect the second linkage means laterally relative to said first direction and out of operative engagement with the first linkage means as the first linkage means begins to move the second linkage means in the first direction.

11. The apparatus defined by claim 10, wherein the interposer means comprises:
(a) a hub mounted for free rotation on a shaft;
(b) and a generally L-shaped member having a first leg member disposed for engagement with a dog of the second linkage means, and a second leg member engageable by the control arm means.

12. The apparatus defined by claim 11, wherein:
(a) the transfer arm means comprises first and second transfer arm assemblies pivotally mounted at their lower ends and disposed on opposite sides of the selected cartridge, the first and second transfer arm assemblies being swingable between a first position remote from the selected cartridge and a second position engaging the cartridge;
(b) and the control arm means comprises a control arm mounted directly to one of the transfer arm assemblies and swingable through an arcuate path between its first and second positions, said first and second positions corresponding directly to the first and second positions of the transfer arm assemblies.

13. The apparatus defined by claim 12, wherein the first and second transfer arm assemblies are normally biased to their second position.

14. The apparatus defined by claim 3, wherein the actuator means and operator means are commonly driven.

15. Apparatus for storing and transferring information, comprising:
(a) cartridge storage means for releasably holding a plurality of electromagnetic tape cartridges in predetermined relative positions;
(b) housing means for movably supporting the cartridge storage means;
(c) at least one station means carried by the housing means and each including a read/write head, each station means selectively providing for
  (i) releasing a selected cartridge from the cartridge storage means;
  (ii) moving the selected cartridge to an operative position relative to the read/write head;
  (iii) moving electromagnetic tape in the cartridge relative to the read/write head to effect the transfer of electromagnetic information therebetween; and
  (iv) returning the selected cartridge to its position within the cartridge storage means;
(d) and aborting means for sensing improper orientation of the selected cartridge in the storage means and for precluding release of the selected cartridge from the storage means if said orientation is improper.

16. Apparatus for storing and transferring information, comprising:
(a) cartridge storage means for releasably holding a plurality of electromagnetic tape cartridges in predetermined relative positions;
(b) housing means for movably supporting the cartridge storage means;
(c) at least one station means carried by the housing means and including a read/write head;
(d) indexing means for moving the cartridge storage means relative to the station means to selectively position any cartridge relative to the station means for release thereto;
(e) said station means comprising
  (i) means for releasing a selected cartridge from the cartridge storage means;
  (ii) a pair of transfer arm assemblies disposed on opposite sides of the selected cartridge and movable between a first position remote from the selected cartridge and a second position engaging the cartridge on each side thereof;

(iii) actuating means for moving the transfer arm assemblies between said first and second positions;

(iv) pawl means associated with each transfer arm assembly for moving the selected cartridge between its release position and a read/write position relative to the read/write head;

(v) and means for moving the pawl means between said release and read/write positions.

17. The apparatus defined by claim 16, wherein:

(a) each of the transfer arm assemblies comprises an elongated transfer arm member;

(b) and the means for moving the pawl means comprises an endless belt longitudinally and movably carried by the elongated transfer arm member.

18. The apparatus defined by claim 17, wherein the endless belt is carried between a drive member and an idler member which are rotatably carried by the elongated transfer arm member in longitudinally spaced relation.

19. The apparatus defined by claim 18, wherein:

(a) the drive member comprises a drive gear;

(b) the idler member comprises an idler gear;

(c) the endless belt comprises a toothed timing belt;

(d) and the means for moving the pawl means further comprises means for synchronously driving the drive gears.

20. The apparatus defined by claim 19, wherein the synchronous driving means comprises:

(a) a gear pulley rotatable with each drive gear;

(b) first and second synchronizing gears disposed in rotatable intermeshing relation;

(c) one of said first and second synchronizing gears mounted on a drive shaft;

(d) motor means for rotating the drive shaft;

(e) and a timing belt operably connecting each of said first and second synchronizing gears with one of said gear pulleys.

21. The apparatus defined by claim 17, wherein each elongated transfer arm member defines an elongated recess in which the endless belt moves.

22. The apparatus defined by claim 17, wherein each pawl means comprises a pawl member secured to the associated endless belt, the pawl members projecting laterally from the endless belts and toward each other.

23. The apparatus defined by claim 16, wherein the transfer arm assemblies are elongated in shape and pivotally carried at one end thereof for pivotal swinging movement between said remote and cartridge engaging positions.

24. The apparatus defined by claim 23, wherein the transfer arm assemblies are generally vertically disposed, each being pivotally carried at its lower end.

25. The apparatus defined by claim 24, wherein the lower end of each transfer arm assembly is disposed proximate the read/write station, and the upper end is disposed proximate the cartridge.

26. The apparatus defined by claim 25, which further comprises a lever member rigidly secured to each transfer arm assembly proximate its lower end, and wherein the actuating means is constructed to commonly impart a force to the lever members to move the transfer arm assemblies between said remote and cartridge engaging positions.

27. The apparatus defined by claim 26, which further comprises:

(a) means for normally biasing the transfer arm assemblies to the cartridge engaging position;

(b) and wherein the actuating means imparts a force to the lever members only in a direction which opposes the biasing means to move the transfer arm assemblies to the remote position.

28. The apparatus defined by claim 27, wherein the actuating means comprises:

(a) a cam mounted for rotation on a cam shaft;

(b) means for rotating the cam shaft;

(c) and cam follower means operatively disposed between the cam and lever members.

29. The apparatus defined by claim 28, wherein the lever members project toward each other, and further comprising an engagement member commonly connecting the lever members and disposed for operative engagement with the cam follower means.

30. The apparatus defined by claim 29, wherein:

(a) the ends of the lever members overlap;

(b) and the engagement member is affixed to one end of one lever member and projects through the end of the other to permit pivotal movement therebetween.

31. The apparatus defined by claim 29, wherein the cam follower means comprises an arm follower mounted for pivotal movement relative to the cam and normally biased into engagement therewith, the arm follower having a lever projecting therefrom and arranged to engage said engagement member.

32. The apparatus defined by claim 28, wherein the station means operates through cartridge load and unload cycles, the cam is configured to move the transfer arm assemblies from the remote to the cartridge engaging position at substantially the beginning of each of the cartridge load and unload cycles, and to move the transfer arm assemblies from the cartridge engage to the remote position at substantially the end of the load and unload cycles.

33. The apparatus defined by claim 32, wherein the cam shaft rotating means comprises a reversible electric motor.

34. The apparatus defined by claim 23, and further comprising means for normally biasing the transfer arm assemblies to the cartridge engaging position.

35. The apparatus defined by claim 16, which further comprises:

(a) a first reference stop disposed relative to the read/write head for engagement by the cartridge as it moves to the read/write position;

(b) and means for imparting a first reference force of predetermined magnitude to the cartridge to hold it against the first reference stop during a read/write operation.

36. The apparatus defined by claim 35, wherein the means for moving the pawl means comprises drive shaft means, and the means for imparting said first reference force comprises tensioner means operably connected with the drive means and pawl means for resiliently yielding to the drive means when the cartridge engages the first reference stop, said first reference force resulting from said resilient yielding.

37. The apparatus defined by claim 36, wherein the tensioner means comprises:

(a) first and second colinear drive shafts mounted for relative rotation;

(b) an input section mounted on the first drive shaft for rotation relative thereto;

(c) an output section mounted on the second drive shaft for rotation relative thereto;

(d) a torsion spring operatively connected between the input and output sections;

(e) and engagement means for establishing nonyielding engagement between
  (i) the first drive shaft and the input section when the first drive shaft is rotated in a first direction;
  (ii) the first drive shaft and the output section when the first drive shaft is rotated in a direction opposite the first direction;
  (iii) the input section and the second drive shaft when the input section is rotated in said first direction;
  (iv) and the input section and the first drive shaft when the input section is rotated in said opposite direction.

38. The apparatus defined by claim 37, wherein the engagement means comprises:
(a) a first pin projecting radially from the first drive shaft;
(b) a second pin projecting radially from the second drive shaft;
(c) a third pin projecting axially from the input section toward the output section;
(d) and a fourth pin projecting axially from the output section toward the input section;
(e) the third and fourth pins being disposed for engagement with both of said first and second pins.

39. The apparatus defined by claim 37, wherein the input section comprises a first spool half having a first hub and a first flange, and the output section comprises a second spool half having a second hub and second flange, and the torsion spring comprises a coil spring commonly encircling the first and second spool hubs and having ends respectively connected to the first and second spool flanges.

40. The apparatus defined by claim 39, wherein one of said spool flanges is constructed and arranged for rotational adjustment relative to its associated spool hub to permit adjustment of the torsion spring force.

41. The apparatus defined by claim 35, which further comprises:
(a) a second reference stop disposed laterally of the cartridge in the read/write position;
(b) and means for imparting a lateral reference force of predetermined magnitude to the cartridge to hold it against the second reference stop during the read/write operation.

42. The apparatus defined by claim 41, wherein the means for imparting the second reference force comprises:
(a) engagement means mounted for lateral movement toward and away from the cartridge in the read/write position;
(b) spring means for normally urging the engagement means into lateral engagement with a cartridge in the read/write position;
(c) and control means operable in opposition to the spring means for selectively moving the engagement means to a cartridge nonengaging position.

43. The apparatus defined by claim 38, wherein:
(a) the engagement means comprises first and second pivotally mounted bias plates of bell crank configuration disposed in spaced relation;
(b) and the control means comprises
  (i) a pivotally mounted bail member disposed for simultaneous movable engagement with the bias plates;
  (ii) and cam means disposed in operative engagement with the bail member for moving the bail member to a position permitting the spring means to move the bias plates to a cartridge engaging position.

44. The apparatus defined by claim 16, which further comprises aborting means for sensing the position of the transfer arm assemblies, and for precluding release of the selected cartridge from the cartridge storage means if the transfer arm assemblies are prevented from reaching their second position.

45. The apparatus defined by claim 16, wherein the cartridge storage means comprises a carousel in which the plurality of electromagnetic tape cartridges are disposed in a radial array, the housing means being constructed to support the carousel for revolvement relative to the station means.

46. Apparatus for storing and transferring information, comprising:
(a) carousel means for storing a plurality of electromagnetic tape cartridges in a radial array, the carousel means having a retaining gate for each cartridge;
(b) housing means for rotatably supporting the carousel means and having at least one read/write station having a read/write head and a read/write position for the selected cartridge;
(c) indexing means for controllably rotating the carousel means to position the selected cartridge relative to the read/write station;
(d) the station means comprising
  (i) gate actuator means for operating the retaining gate to release the selected cartridge;
  (ii) first and second transfer arm assemblies disposed on opposite sides of the selected cartridge and movable between a first position remote from the selected cartridge and a second position engaging the cartridge on each side thereof;
  (iii) actuating means for moving the transfer arm assemblies between said first and second positions;
  (iv) pawl means associated with each transfer arm assembly for moving the selected cartridge between its release position and a read/write position relative to the read/write head;
  (v) and means for moving the pawl means between said release and read/write positions.

47. The apparatus defined by claim 46, wherein:
(a) the gate actuator means comprises a first cam and first cam follower means operatively connected to the retaining gate;
(b) the actuating means comprises a second cam and second cam follower means operatively connected to the transfer arm assemblies;
(c) and the first and second cams are mounted on a cam shaft rotatably carried by the station means and rotatably driven by motor means.

48. The apparatus defined by claim 47, wherein:
(a) the means for moving the pawl means comprises an endless belt movably carried by each transfer arm assembly between a drive member and an idler member;
(b) a drive shaft rotatably driven by motor means;
(c) and drive means operably connecting the drive shaft and the respective drive members.

49. The apparatus defined by claim 48, wherein the drive means comprises first and second gears each mounted for rotation with one of the drive members, the first and second gears being identically constructed and disposed in intermeshing relation to effect synchronous operation of the pawl means.

50. The apparatus defined by claim 49, wherein one of said first and second gears is mounted on the drive shaft.

51. The apparatus defined by claim 48, wherein the cam shaft and drive shaft are commonly driven by a single motor means.

52. The apparatus defined by claim 51, which further comprises:
(a) a first reference stop disposed relative to the read/write head for engagement by the cartridge as it moves to the read/write position;
(b) and tensioner means operably mounted on the drive shaft for resiliently yielding to the drive shaft when the cartridge reaches the first reference stop and thereby imposes a first reference force of predetermined magnitude to the cartridge to hold it against the first reference stop during a read/write operation.

53. The apparatus defined by claim 52, which further comprises:
(a) a second reference stop disposed laterally of the cartridge in the read/write position;
(b) and means for imparting a lateral reference force of predetermined magnitude to the cartridge to hold it against the second reference stop during the read/write operation.

54. The apparatus defined by claim 53, wherein the means for imparting the second reference force comprises:
(a) engagement means mounted for lateral movement toward and away from a cartridge in the read/write position;
(b) spring means for normally urging the engagement means into lateral engagement with a cartridge in the read/write position;
(c) and control means operable in opposition to the spring means for selectively moving the engagement means to a cartridge nonengaging position.

55. The apparatus defined by claim 54, wherein the control means comprises:
(a) a third cam mounted on the cam shaft;
(b) and third cam follower means operatively connecting the third cam and the engagement means.

56. Carousel apparatus for storing a plurality of electromagnetic tape cartridges in a radial array, the carousel apparatus comprising:
(a) a circular carrier member capable of horizontal orientation and defining a plurality of radial slots each sized and disposed to receive a cartridge in substantially vertical orientation;
(b) means associated with each radial slot for releasably retaining the associated cartridge and including
(i) a gate member projecting downwardly from the associated slot and laterally deflectable relative thereto;
(ii) and a retaining foot disposed at the lower end of the gate member, the retaining foot retaining the associated cartridge in its slot when the gate member is in a nondeflected state, and releasing the associated cartridge when the gate member is laterally deflected.

57. Carousel apparatus defined by claim 56, wherein:
(a) the circular carrier member comprises a circular plate through which said radial slots are formed;
(b) and the cartridge retaining means comprises a plurality of individual dividers for the respective slots, each divider being generally wedge-shaped to permit said plurality of dividers to be arranged side-by-side in circular fashion, each divider being secured to the bottom of the circular plate adjacent the associated slot.

58. The apparatus defined by claim 56, and further comprising a centrally disposed handle member secured to the circular carrier member.

59. The apparatus defined by claim 56, and further comprising second cartridge retaining means movably disposed above the radially arranged slots between a first position blocking at least part of each slot and a second position in which the slots are not blocked.

60. The apparatus defined by claim 59, wherein the second cartridge retaining means comprises:
(a) a retaining ring having a plurality of radially projecting teeth circumferentially spaced in accordance with the spacing of the cartridge slots, the retaining ring being rotatably carried by the circular member above the cartridge slots;
(b) and spring means for normally biasing the retaining ring to said first position.

61. Apparatus for transporting a standard electromagnetic tape cartridge having transporting notches on opposed sides thereof between a first position associated with a read/write head and a second position remote from the first position, the apparatus comprising:
(a) means for holding the tape cartridge in said second position;
(b) a pair of elongated transfer arm assemblies disposed on opposite sides of the cartridge and movable between cartridge-engaging and cartridge-nonengaging positions;
(c) actuating means for moving the transfer arm assemblies between the cartridge-engaging and nonengaging positions;
(d) pall means associated with each transfer arm assembly and constructed for matable engagement with the cartridge notches when the associated transfer arm assembly is in the cartridge-engaging position;
(e) and means for synchronously moving the pall means longitudinally along the transfer arm assemblies when the transfer arm assemblies are in their cartridge-engaging positions to move the cartridge between said first and second positions.

* * * * *

UNITED STATES PATENT AND TRADEMARK OFFICE
CERTIFICATE OF CORRECTION

PATENT NO. : 4,164,765
DATED : August 14, 1979
INVENTOR(S) : Walter Gysling

It is certified that error appears in the above-identified patent and that said Letters Patent are hereby corrected as shown below:

In the Abstract, line 3, "pipe" should be --tape--

In the specification, Column 14, line 48, "233" should be --223--

Column 21, line 24, "177" should be --277--

Signed and Sealed this

Eleventh Day of December 1979

[SEAL]

Attest:

*Attesting Officer*

SIDNEY A. DIAMOND
*Commissioner of Patents and Trademarks*